US008855472B2

(12) United States Patent  
Tagawa et al.

(10) Patent No.: US 8,855,472 B2  
(45) Date of Patent: Oct. 7, 2014

(54) VIDEO EDITING APPARATUS, VIDEO EDITING METHOD, PROGRAM, AND INTEGRATED CIRCUIT

(75) Inventors: Junichi Tagawa, Kyoto (JP); Takashi Kawamura, Kyoto (JP); Kuniaki Isogai, Osaka (JP); Takashi Fujii, Osaka (JP); Masayuki Misaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 7 days.

(21) Appl. No.: 13/824,077

(22) PCT Filed: May 7, 2012

(86) PCT No.: PCT/JP2012/002995  
§ 371 (c)(1),  
(2), (4) Date: Mar. 15, 2013

(87) PCT Pub. No.: WO2013/014836  
PCT Pub. Date: Jan. 31, 2013

(65) Prior Publication Data  
US 2013/0170817 A1    Jul. 4, 2013

(30) Foreign Application Priority Data

Jul. 26, 2011   (JP) ................................ 2011-163602

(51) Int. Cl.  
*H04N 9/87* (2006.01)  
*G11B 27/034* (2006.01)  
*H04N 13/00* (2006.01)  
*G11B 27/34* (2006.01)  
*H04N 5/76* (2006.01)

(52) U.S. Cl.  
CPC ............... *H04N 9/87* (2013.01); *G11B 27/034* (2013.01); *H04N 13/0022* (2013.01); *G11B 27/34* (2013.01)  
USPC ........................................................ 386/282

(58) Field of Classification Search  
USPC ......................................................... 386/282  
See application file for complete search history.

(56) References Cited

U.S. PATENT DOCUMENTS

| 8,044,997 | B2  |   | 10/2011 | Masuda et al.          |         |
|-----------|-----|---|---------|------------------------|---------|
| 2002/0140816 | A1 | * | 10/2002 | McGrath et al. ........ | 348/180 |
| 2005/0235335 | A1 | * | 10/2005 | Morita et al. .......... | 725/133 |
| 2009/0244268 | A1 | * | 10/2009 | Masuda et al. .......... | 348/51  |
| 2011/0249958 | A1 | * | 10/2011 | Fujita et al. .......... | 386/280 |

FOREIGN PATENT DOCUMENTS

| JP | 10-40420   | 2/1998 |
|----|------------|--------|
| JP | 2000-59720 | 2/2000 |

(Continued)

OTHER PUBLICATIONS

International Search Report issued Jul. 31, 2012 in corresponding International Application No. PCT/JP2012/002995.

*Primary Examiner* — Thai Tran  
*Assistant Examiner* — Nien-Ru Yang  
(74) *Attorney, Agent, or Firm* — Wenderoth, Lind & Ponack, L.L.P.

(57) ABSTRACT

A video editing apparatus includes: a selection unit which receives a first editing point and a second editing point; a representative value generation unit which generates a representative value of first disparity information on disparities of the first editing point and a representative value of second disparity information on disparities of the second editing point; a comparison value calculation unit which calculates a first depth difference by a comparison between the representative value of the first disparity information and the representative value of the second disparity information; a determination unit which determines whether or not the first depth difference is less than or equal to a predetermined value; and a presenting unit which presents a message prompting a user to change at least one of the first editing point and the second editing point when it is determined that the first depth difference is greater than the predetermined value.

16 Claims, 24 Drawing Sheets

(56) References Cited

FOREIGN PATENT DOCUMENTS

| | | |
|---|---|---|
| JP | 2002-344997 | 11/2002 |
| JP | 2006-128842 | 5/2006 |
| JP | 2009-239388 | 10/2009 |
| JP | 2011-109408 | 6/2011 |
| JP | 2011-114472 | 6/2011 |

* cited by examiner

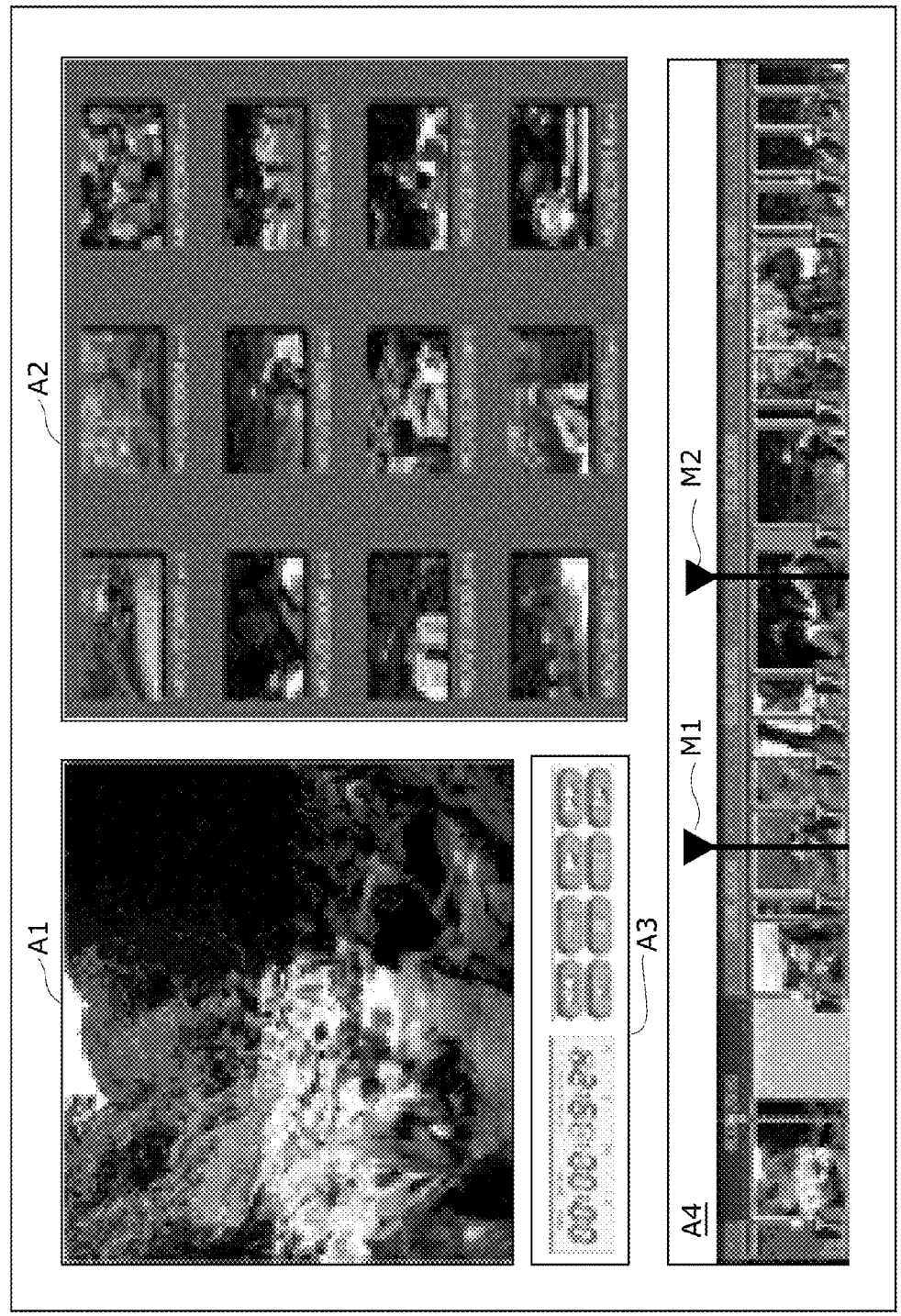

VIDEO EDITING APPARATUS, VIDEO EDITING METHOD, PROGRAM, AND INTEGRATED CIRCUIT

TECHNICAL FIELD

The present invention relates to video editing apparatuses which support editing of three-dimensional video.

BACKGROUND ART

Three-dimensional video, which are provided as a technique of giving humans stereoscopic illusions using disparities between left-eye video and right-eye video, sometimes give viewers discomfort when, because the disparities are used, the disparities are beyond the range of human vision pertaining to binocular disparities. Thus, Patent Literature (PTL) 1 discloses a stereoscopic video signal generator which has a disparity editing function of dynamically solving the problem of degradation in stereoscopic effect in a real time of stereoscopic video display without modifying original video images, by providing a frame disparity editing function for properly setting and storing display positions of left-eye video and right-eye video and a frame disparity control function for dynamically controlling display positions of left and right images per frame.

CITATION LIST

Patent Literature

[PTL 1] Japanese Unexamined Patent Application Publication No. 2006-128842

SUMMARY OF INVENTION

Technical Problem

However, when three-dimensional video are edited, there is a case where the edited three-dimensional video give viewers a feeling of strangeness.

Thus, in view of such problems, an object of the present invention is to provide a video editing apparatus which is capable of easy editing of three-dimensional video in a way that the edited three-dimensional video will not give viewers a feeling of strangeness.

Solution to Problem

In order to achieve the above object, the video editing apparatus according to an aspect of the present invention is a video editing apparatus which cuts out, from three-dimensional video including right-eye video and left-eye video, part of the three-dimensional video between a first point in time and a second point in time different from the first point in time when a user selects a first editing point of the three-dimensional video at the first point in time and a second editing point of the three-dimensional video at the second point in time, the video editing apparatus comprising: a selection unit configured to receive the first and second editing points selected by the user; a representative value generation unit configured to generate a representative value of first disparity information on disparities of the first editing point and a representative value of second disparity information on disparities of the second editing point; a comparison value calculation unit configured to calculate, as a first comparison value, a value which is based on a comparison between the representative value of the first disparity information and the representative value of the second disparity information; a determination unit configured to determine whether or not the first comparison value calculated by the comparison value calculation unit is less than or equal to a predetermined value; and a presenting unit configured to present a message prompting a user to change at least one of the first editing point and the second editing point when the determination unit determines that the first comparison value is greater than the predetermined value.

It is to be noted that these general or specific aspects may be implemented using a method, a program or a recording medium, or an integrated circuit, or any combination of methods, programs or recording media, or integrated circuits.

Advantageous Effects of Invention

Using the video editing apparatus according to an aspect of the present invention, it is possible to easily edit three-dimensional video in a way that the edited three-dimensional video will not give viewers a feeling of strangeness.

BRIEF DESCRIPTION OF DRAWINGS

FIG. 3A shows an example of a graphical user interface (GUI) of video editing software.

DESCRIPTION OF EMBODIMENTS

Figure 1:
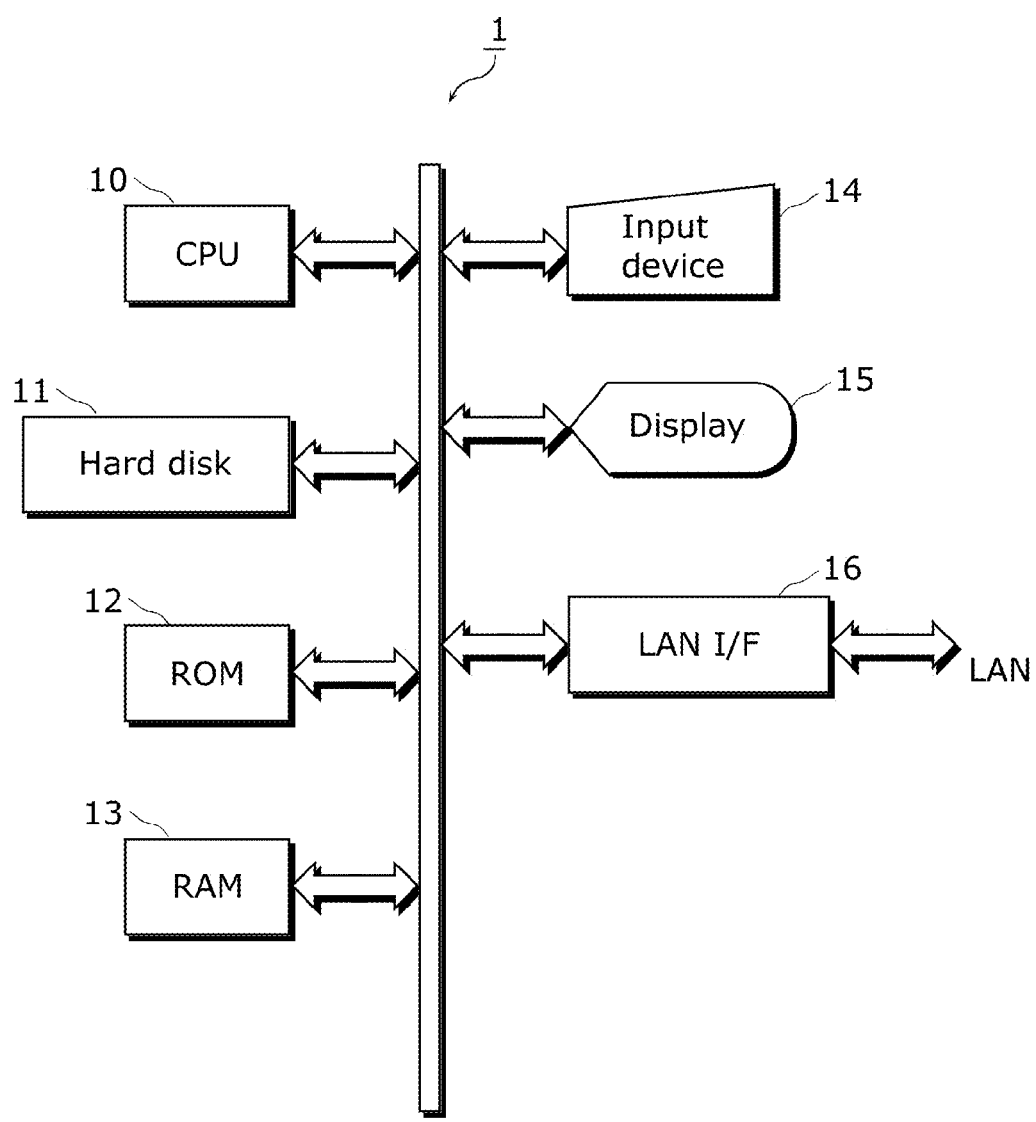
FIG. 1 is a block diagram showing a hardware configuration of a terminal device including a video editing apparatus according to Embodiment 1 of the present invention.

Underlying Knowledge Forming Basis of the Present Invention

In relation to the stereoscopic video signal generator disclosed in the Background Art section, the inventors have found the following problem.

As to three-dimensional video, other than the above-described case where discomfort is given as in PTL 1, there is a case where editing of the three-dimensional video causes such a change in depth at a cut point that an object will abruptly appear in front, for example, and in this case, viewers may be given an intense feeling of strangeness. Hence, in order not to give viewers such a feeling of strangeness, editors, photographers, or the like persons need to do tasks based on their experiences, such as an editor's careful selection of materials before and after a cut point or an ingenious shooting procedure for preparing materials, which requires high costs. Furthermore, since it is difficult for inexperienced persons to shoot or edit three-dimensional video, there is a problem that consumer application is not likely.

In order to solve the above problem, the video editing apparatus according to an aspect of the present invention is a video editing apparatus which cuts out, from three-dimensional video including right-eye video and left-eye video, part of the three-dimensional video between a first point in time and a second point in time different from the first point in time when a user selects a first editing point of the three-dimensional video at the first point in time and a second editing point of the three-dimensional video at the second point in time, the video editing apparatus comprising: a selection unit configured to receive the first and second editing points selected by the user; a representative value generation unit configured to generate a representative value of first disparity information on disparities of the first editing point and a representative value of second disparity information on disparities of the second editing point; a comparison value calculation unit configured to calculate, as a first comparison value, a value which is based on a comparison between the representative value of the first disparity information and the representative value of the second disparity information; a determination unit configured to determine whether or not the first comparison value calculated by the comparison value calculation unit is less than or equal to a predetermined value; and a presenting unit configured to present a message prompting a user to change at least one of the first editing point and the second editing point when the determination unit determines that the first comparison value is greater than the predetermined value.

With this, a user can select editing points between which the depth change is not significant, by changing at least one of the first editing point and the second editing point. Accordingly, it is possible to eliminate the user's tasks needed to be done looking at shot images in editing three-dimensional video, such as an ingenious shooting procedure and a careful selection of materials before and after a cut point, so as not to cause a change in depth of an object at the cut point, with the result that the load on a user in editing three-dimensional video can be reduced.

Furthermore, for example, it may be that the representative value generation unit is further configured to obtain a representative value of third disparity information on disparities of a candidate editing point at a point in time different from the first point in time when the first comparison value is greater than the predetermined value, the representative value of the third disparity information being within a first predetermined range including the first point in time, the comparison value calculation unit is further configured to calculate, as a second comparison value, a value which is based on a comparison between the representative value of the second disparity information and the representative value of the third disparity information, the determination unit is further configured to determine whether or not the second comparison value is less than or equal to the predetermined value, and the presenting unit is further configured to present, to a user, the candidate editing point as a first alternative editing point when the second comparison value is less than or equal to the predetermined value.

Furthermore, for example, it may be that the representative value generation unit is configured to obtain, as the candidate editing point, a plurality of representative values of the third disparity information at points in time, the comparison value calculation unit is configured to calculate a plurality of the second comparison values in a one-to-one correspondence with the representative values of the third disparity information, the determination unit is configured to determine whether or not each of the second comparison values is less than or equal to the predetermined value, and the presenting unit is configured to present, to a user, a candidate editing point corresponding to the second comparison value determined to be less than or equal to the predetermined value, as the first alternative editing point.

With this, a user no longer needs to search for a new editing point. Accordingly, the load on a user in editing three-dimensional video can further be reduced.

Furthermore, for example, it may be that when more than one of the second comparison values is determined to be less than or equal to the predetermined value, the presenting unit is configured to present, to a user, a candidate editing point corresponding to a smallest one of the second comparison values, as the first alternative editing point.

With this, even when there is a plurality of corresponding candidate editing points, a candidate editing point corresponding to the smallest second comparison value can be automatically selected as the first alternative editing point. Thus, the first alternative editing point at which the depth change is smallest can be adopted as the cut point. This makes it easy for users to edit three-dimensional video in a way which makes viewers less likely feel strange.

Furthermore, for example, it may be that when more than one of the second comparison values is determined to be less than or equal to the predetermined value, the presenting unit is configured to present, to a user, a candidate editing point closest to the first point in time among candidate editing points corresponding to the second comparison values, as the first alternative editing point.

With this, even when there is a plurality of corresponding candidate editing points, a candidate editing point closest in position to the editing point selected by a user can be automatically selected. Thus, the editing point selected by the user can be appreciated, and it is possible to automatically narrow down to one candidate editing point.

Furthermore, for example, it may be that the representative value generation unit is further configured to obtain a representative value of third disparity information on disparities of a first candidate editing point at a point in time different from the first point in time and a representative value of fourth disparity information on disparities of a second candidate editing point at a point in time different from the second point in time when the first comparison value is greater than the predetermined value, the representative value of the third disparity information being within a first predetermined range including the first point in time, and the representative value of the fourth disparity information being within a second predetermined range including the second point in time, the comparison value calculation unit is further configured to calculate, as a second comparison value, a value which is based on a comparison between the representative value of the third disparity information and the representative value of the fourth disparity information, the determination unit is further configured to determine whether or not the second comparison value is less than or equal to the predetermined value, and the presenting unit is further configured to present, to a user, the first candidate editing point as a first alternative editing point and the second candidate editing point as a second alternative editing point when the second comparison value is less than or equal to the predetermined value.

Furthermore, for example, it may be that the representative value generation unit is configured to obtain, as the first candidate editing point, a plurality of representative values of the third disparity information at points in time, and obtain, as the second candidate editing point, a plurality of representative values of the fourth disparity information at points in time, the comparison value calculation unit is configured to (i) extract a first minimum value that is a minimum value among the representative values of the third disparity information, a first maximum value that is a maximum value among the representative values of the third disparity information, a second minimum value that is a minimum value among the representative values of the fourth disparity information, and a second maximum value that is a maximum value among the representative values of the fourth disparity information, and (ii) calculate a third comparison value that is a value based on a comparison between the first minimum value and the second minimum value, a fourth comparison value that is a value based on a comparison between the first minimum value and the second maximum value, a fifth comparison value that is a value based on a comparison between the first maximum value and the second minimum value, and a sixth comparison value that is a value based on a comparison between the first maximum value and the second maximum value, the determination unit is further configured to determine whether or not each of the third comparison value, the fourth comparison value, the fifth comparison value, and the sixth comparison value is less than or equal to the predetermined value, and when one of the third comparison value, the fourth comparison value, the fifth comparison value, and the sixth comparison value is less than or equal to the predetermined value, the presenting unit is further configured to (i) refer to the first candidate editing point and the second candidate editing point which correspond to the one of the third comparison value, the fourth comparison value, the fifth comparison value, and the sixth comparison value, which is less than or equal to the predetermined value, and (ii) present, to a user, the first candidate editing point as the first alternative editing point and the second candidate editing point as the second alternative editing point.

With this, a user no longer needs to search for a new editing point. Furthermore, since two alternative editing points, i.e., the first alternative editing point and the second alternative editing point, are searched for, an editing point with a high degree of flexibility can be selected as the cut point. Accordingly, the load on a user in editing three-dimensional video can further be reduced.

Furthermore, for example, it may be that when more than one of the third comparison value, the fourth comparison value, the fifth comparison value, and the sixth comparison value is less than or equal to the predetermined value, the presenting unit is further configured to (i) refer to the first candidate editing point and the second candidate editing point which correspond to a smallest comparison value among the comparison values less than or equal to the predetermined value, and (ii) present, to a user, the first candidate editing point as the first alternative editing point and the second candidate editing point as the second alternative editing point.

With this, even when there is a plurality of corresponding candidate editing points, a set of candidate editing points corresponding to the smallest comparison value can be automatically selected as the first alternative editing point and the second alternative editing point. Thus, the first alternative editing point and the second alternative editing point between which the depth change is smallest can each be adopted as the cut point. This makes it easy for users to edit three-dimensional video in a way which makes viewers less likely feel strange.

Furthermore, for example, it may be that when more than one of the third comparison value, the fourth comparison value, the fifth comparison value, and the sixth comparison value is less than or equal to the predetermined value, the presenting unit is further configured to (i) refer to a combination of the first candidate editing point and the second candidate editing point which are closest to the first point in time and the second point in time among combinations of a plurality of the first candidate editing points and a plurality of the second candidate editing points which correspond to the comparison values less than or equal to the predetermined value, and (ii) present, to a user, the first candidate editing point as the first alternative editing point and the second candidate editing point as the second alternative editing point.

With this, even when there is a plurality of corresponding candidate editing points, a candidate editing point closest in position to the editing point selected by a user can be automatically selected. Thus, the editing point selected by the user can be appreciated, and it is possible to automatically narrow down to one candidate editing point.

Furthermore, for example, it may be that the representative value generation unit is configured to obtain, as the first candidate editing point, a plurality of representative values of the third disparity information at points in time, and obtain, as the second candidate editing point, a plurality of representative values of the fourth disparity information at points in time, the comparison value calculation unit is configured to calculate a plurality of values as a plurality of the second comparison values in a one-to-one correspondence with pairs each made by selecting one of the representative values of the third disparity information and one of the representative values of the fourth disparity information, the plurality of values being based on comparisons between all the possible pairs, the determination unit is configured to determine whether or not each of the second comparison values is less than or equal to the predetermined value, and the presenting unit is configured to (i) refer to the combination of the first candidate editing point and the second candidate editing point which correspond to the second comparison value determined to be less than or equal to the predetermined value, and (ii) present, to a user, the first candidate editing point as the first alternative editing point and the second candidate editing point as the second alternative editing point.

With this, a user no longer needs to search for a new editing point. Furthermore, all the sets of the first candidate editing point and the second candidate editing point are searched for two alternative editing points, i.e., the first alternative editing point and the second alternative editing point, with the result that editing points with a high degree of flexibility can each be selected as the cut point. Accordingly, the load on a user in editing three-dimensional video can further be reduced.

Furthermore, for example, a disparity changing unit may further be provided which changes at least one of the first disparity information and the second disparity information to make the first comparison value less than or equal to the predetermined value when the determination unit determines that all the second comparison values are greater than the predetermined value.

With this, in the case where there is no corresponding candidate point, the first disparity information is compressed so that a difference between the first representative value of the first disparity information at the first editing point and the second representative value of the second disparity information at the second editing point is less than or equal to a predetermined value. Thus, even in the case where no candidate editing point around the first editing point can become an alternative, compressing the disparity information enables the editing such that the depth difference will not be great at the editing point selected by a user. A user therefore only needs to select two editing points, i.e., the first editing point and the second editing point, to cut and edit video in a way that the depth does not change much at the cut point.

Furthermore, for example, it may be that the representative value is a maximum value, a mean value, or a variance of a plurality of disparities calculated for respective pixels or blocks included in a corresponding frame.

With this, as the representative value, the maximum value, the mean value, or the variance of a plurality of disparities calculated on a pixel or block basis is adopted. Thus, a value definite as a statistical value can be used, with the result that the disparity information can be appropriately processed.

Furthermore, for example, it may be that the predetermined value is associated in an expression or a table with a size of a display unit displaying the three-dimensional video and changes based on the size of the display unit which is designated in advance by a user.

With this, the predetermined value and the size of the display unit which displays the three-dimensional video are associated with each other in an expression or a table, which makes it possible to provide the setting such that an appropriate video editing process is performed according to the size of the display unit owned by the user.

It is to be noted that these general or specific aspects may be implemented using a method, a program or a recording medium, or an integrated circuit, or any combination of methods, programs or recording media, or integrated circuits.

The video editing apparatus according to an aspect of the present invention shall be described below with reference to the drawings.

It is to be noted that each of the embodiments described below shows a specific example of the present invention. The structural elements, steps, the order of steps, etc. shown in the embodiments below are an example and do not limit the present invention. In addition, among the structural elements in the embodiments below, structural elements not recited in any of the independent claims indicating the broadest concept are described as arbitrary structural elements.

Embodiment 1

Hardware Configuration

A video editing apparatus 100 cuts out, from three-dimensional video including right-eye video and left-eye video, part of the three-dimensional video between a first point in time and a second point in time different from the first point in time when a user selects a first editing point of the three-dimensional video at the first point in time and a second editing point of the three-dimensional video at the second point in time. It is to be noted that the first editing point of the three-dimensional video at the first point in time indicates a frame of the three-dimensional video which is located at the first point in time, and the second editing point indicates a frame of the three-dimensional video which is located at the second point in time.

FIG. 1 is a block diagram showing a hardware configuration of a terminal device including the video editing apparatus according to Embodiment 1 of the present invention.

A terminal device 1 mainly includes, as shown in FIG. 1, a central processing unit (CPU) 10, a hard disk 11, a read only memory (ROM) 12, a random access memory (RAM) 13, an input device 14, a display 15, and a local area network interface (LANI/F) 16.

The CPU 10 controls the whole terminal device 1 by executing an application program stored in the hard disk 11 or the ROM 12.

In the hard disk 11, a program such as a video processing program, three-dimensional video data obtained from a 3D supported digital camera or a 3D supported video camera, and so on have been stored. Here, "video processing program" is an application program for performing later-described image processing on the three-dimensional video data.

In the ROM 12, firmware such as a basic input/output system (BIOS), a running program for activating the terminal device 1, setting information, and so on have been stored.

The RAM 13 is a readable and writable memory in which data such as a later-described disparity map and the three-dimensional video data which the CPU 10 uses upon executing the program stored in the hard disk 11 are temporarily held.

The input device 14 is a keyboard, a pointing device such as a mouse or a touch panel, or the like which receives input from a user.

The display 15 is a CRT display, a liquid-crystal display, a plasma display, an organic EL display, or the like, for displaying data transmitted from the RAM 13, in the form of characters, images, etc.

The LANI/F 16 is a communication adaptor which connects the terminal device 1 and the LAN 6. The LANI/F 16 transmits, under control of the CPU 10, data, such as the three-dimensional video data held in the hard disk 11 of the terminal device, for example, to another terminal device or the like. Furthermore, the LANI/F 16 receives data or the like transmitted to the terminal device 1 from another terminal device.

A USBI/F 17 is a communication adaptor which connects the terminal device 1 and a digital camera, a video camera, or the like. Through the USBI/F 17, the three-dimensional video data obtained by a digital camera, for example, is received by the terminal device 1 and then stored in the hard disk 11.

<Function Structure>

Figure 2:
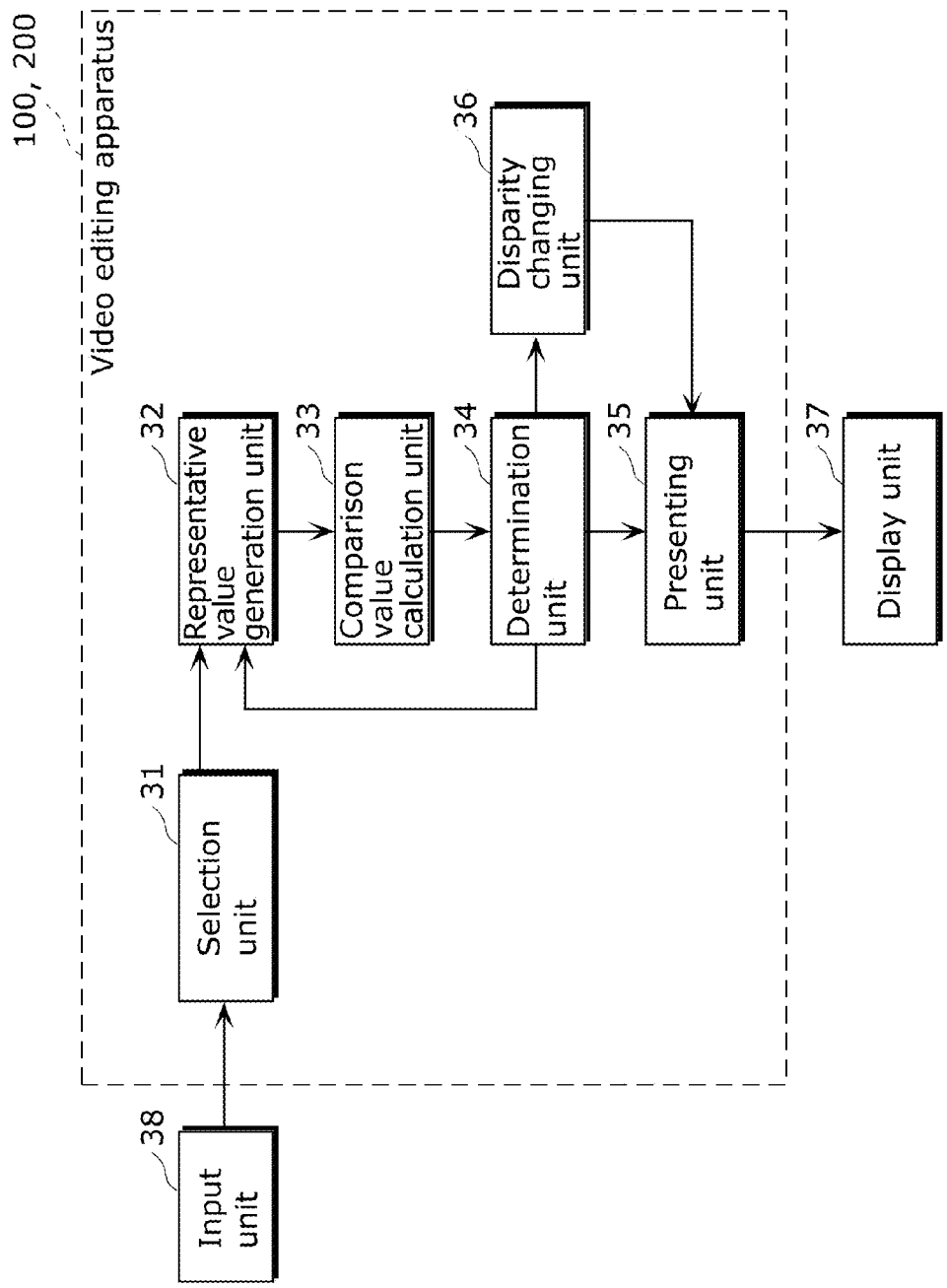
FIG. 2 is a block diagram showing a functional structure related to a video editing process in the video editing apparatus according to the present embodiment.

FIG. 2 is a block diagram showing a functional structure related to a video editing process in the video editing apparatus 100 according to the present embodiment. In other words, FIG. 2 is a block diagram showing a structure of functions related mainly to the video editing process in the video editing apparatus 100 according to the present embodiment among the functions of the terminal device 1 which are implemented by the hardware configuration shown in FIG. 1.

The video editing apparatus 100 functionally includes a selection unit 31, a representative value generation unit 32, a comparison value calculation unit 33, a determination unit 34, a presenting unit 35, a disparity changing unit 36, a display unit 37, and an input unit 38.

The selection unit 31 is a processing unit which is implemented using the CPU 10 in FIG. 1, a program, or the like. The selection unit 31 receives the first and second editing points selected by a user.

The representative value generation unit 32 is a processing unit which is implemented using the CPU 10 in FIG. 1, a program, or the like. The representative value generation unit 32 obtains a representative value of first disparity information on disparities of a first frame at the first editing point and a representative value of second disparity information on disparities of a second frame at the second editing point. It is to be noted that "representative value" herein indicates the maximum value of per-pixel disparities of each frame. In the case where the first comparison value is greater than a predetermined value (see below), the representative value generation unit 32 further obtains representative values of third disparity information which are within a first predetermined range R1 including the first point in time and are related to disparities of third frames at candidate editing points at points in time which are other than the first point in time.

The comparison value calculation unit 33 is a processing unit which is implemented using the CPU 10 in FIG. 1, a program, or the like. The comparison value calculation unit 33 calculates, as a first comparison value, a value which is based on the comparison between the representative value of the first disparity information and the representative value of the second disparity information. Specifically, the comparison value calculation unit 33 calculates, as the first comparison value, a first depth difference ΔD1 that is a difference between the maximum value D1 of disparities at all the pixels of the first frame (the representative value of the first disparity information) and the maximum value D2 of disparities at all the pixels of the second frame (the representative value of the second disparity information). Furthermore, the comparison value calculation unit 33 calculates, as second comparison values, values which are based on the comparison between the representative value of the second disparity information and the representative values of the third disparity information. Specifically, the comparison value calculation unit 33 calculates, as the second comparison values, second depth differences ΔD2 each of which is a difference between the maximum value D2 of disparities at all the pixels of the second frame (the representative value of the second disparity information) and the maximum value of disparities at all the pixels of a corresponding one of the third frames (the representative value of the third disparity information).

The determination unit 34 is a processing unit which is implemented using the CPU 10 in FIG. 1, a program, or the like. The determination unit 34 determines whether or not the first comparison value calculated by the comparison value calculation unit 33 is less than or equal to a predetermined value. Furthermore, the determination unit 34 determines whether or not each of the second comparison values calculated by the comparison value calculation unit 33 is less than or equal to a predetermined value.

The presenting unit 35 is a processing unit which is implemented using the CPU 10 in FIG. 1, a program, or the like. The presenting unit 35 presents a message prompting a user to change at least one of the first editing point and the second editing point when the determination unit determines that the first comparison value is greater than the predetermined value. Furthermore, to a user, the presenting unit 35 presents, as a first alternative editing point, a candidate editing point corresponding to the second comparison value determined to be less than or equal to the predetermined value. Moreover, when more than one of the second comparison values is determined to be less than or equal to the predetermined value, the presenting unit 35 presents, to a user, a candidate editing point corresponding to the smallest one of the second comparison values, as the first alternative editing point.

The disparity changing unit 36 is a processing unit which is implemented using the CPU 10 in FIG. 1, a program, or the like. The disparity changing unit 36 changes at least one of the first disparity information and the second disparity information so that the first comparison value become less than or equal to the predetermined value, when the determination unit 34 determines that all the second comparison values are greater than the predetermined value.

The display unit 37 is implemented using the display 15 shown in FIG. 1. The display unit 37 shows the display of a graphic user interface (GUI) of an application program, such as video editing software, the message presented by the presenting unit 35, and so on.

The input unit 38 is implemented using the input device 14 shown in FIG. 1. The input unit 38 is operated by a user and thereby transmits an input signal to the selection unit 31 to allow selection of the first editing point and the second editing point.

<User Interface>

Figure 3B:
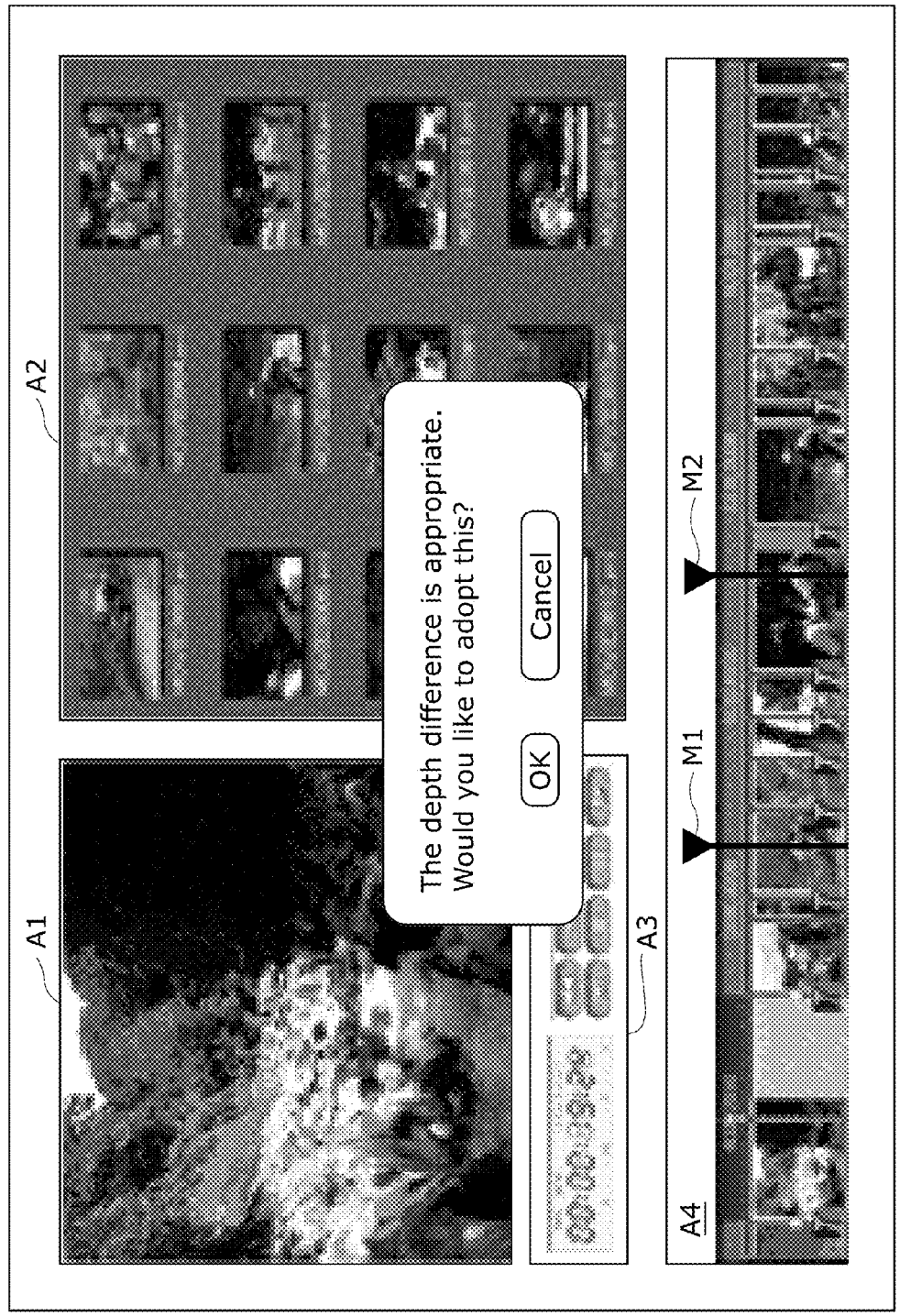
FIG. 3B shows an example of a popup box displayed on the GUI of the video editing software when editing points are determined to be appropriate.

In the video editing apparatus 100, the functions in the respective functional blocks shown in FIG. 2 are implemented through activation of the video editing software. Therefore, the GUI of the video editing software will be shown on the display unit 37 as described above. FIGS. 3A to 3D each shows an example of the GUI of the video editing software. As shown in FIG. 3A, a user operation screen in the video editing process is displayed upon activation of the video editing software. This operation screen includes a preview screen area A1, a library selection section A2, an operation section A3, and an editing track display section A4.

In the preview screen area A1, video data selected in the library selection section A2 is displayed.

In the library selection section A2, one frame out of the plural pieces of three-dimensional video data stored in the hard disk 11 of the terminal device 1 is displayed as a thumbnail. It is to be noted that the thumbnail displayed in the library selection section A2 may be a still image of one scene cut out of the three-dimensional video data and may alternatively be video in a predetermined range of time out of the three-dimensional video data. A user can select one of the video data displayed as the thumbnails in the library selection section A2, by operating the input unit 38.

In the operation section A3, buttons are displayed, such as play, pause, skip (random access), search (fast forward and fast rewind), play in slow motion, and the like. A user can select a button by operating the input unit 38 so that the three-dimensional video data selected in the library selection section A2 is reproduced in the preview screen area A1.

In the editing track display section A4, a time line of the three-dimensional video data selected in the library selection section A2 is displayed. Furthermore, in the editing track display section A4, a first editing point M1 at a first point in time in the time line of the three-dimensional video data and a second editing point M2 at a second point in time in the time line are selected by the selection unit 31 based on the input signal received as a result of a user's operation of the input unit 38. This means that, by selecting the first editing point M1 and the second editing point M2, a user can edit the three-dimensional video data to cut out data between the first editing point M1 and the second editing point M2.

Furthermore, as shown in FIG. 3B, the presenting unit 35 presents a popup box on the screen of FIG. 3A through a later-described video editing process. Details of content which is presented by the presenting unit 35 through the video editing process will be described later.

<Flowchart>

Next, a procedure in the video editing process of the video editing apparatus 100 according to Embodiment 1 configured as above is described.

Figure 4:
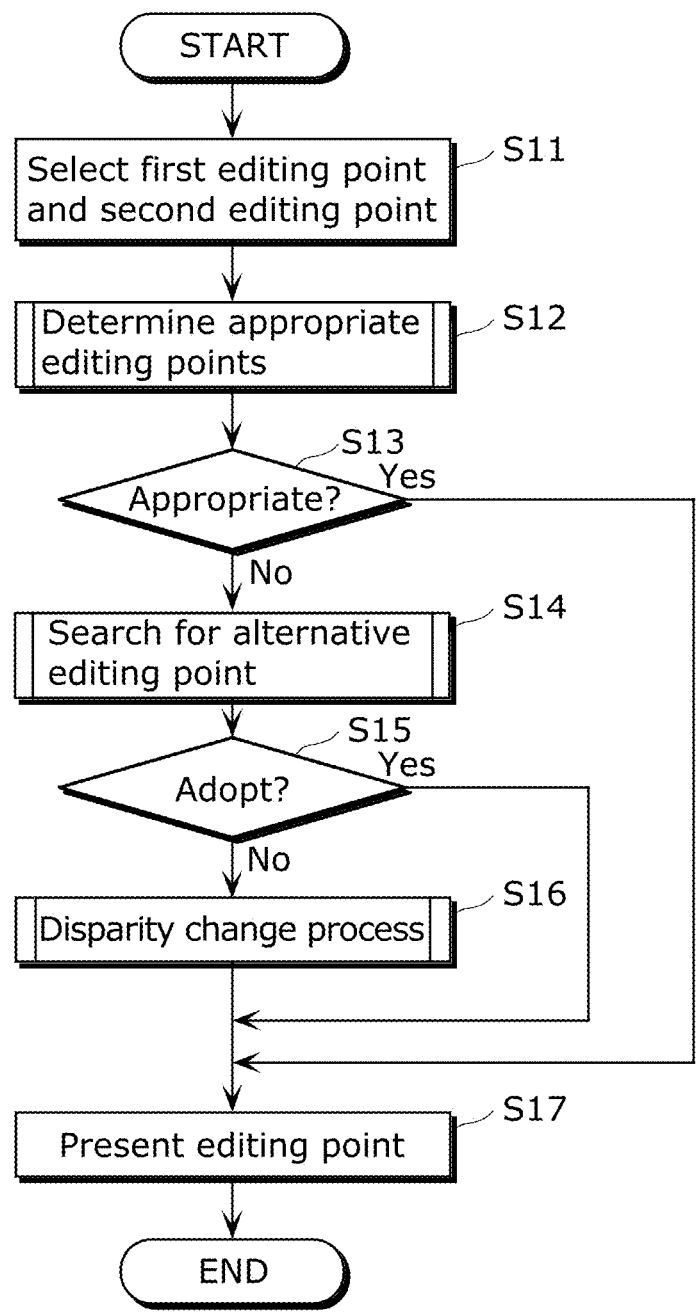
FIG. 4 is a flowchart showing a procedure in a video editing process on three-dimensional video data in the video editing apparatus according to Embodiment 1.

FIG. 4 is a flowchart showing the procedure in the video editing process on the three-dimensional video data in the video editing apparatus 100 according to this embodiment.

As shown in FIG. 4, a user operates the input unit 38 to input the beginning of an unnecessary scene of the three-dimensional video data as the first editing point M1, and input the end of the unnecessary scene as the second editing point M2. On the basis of the input signal resulting from this user's operation of the input unit 38, the selection unit 31 selects the first editing point M1 and the second editing point M2 (S11).

Next, a process of determining whether or not the first editing point M1 and the second editing point M2 are appropriate editing points is performed (S12). The process of determining appropriate editing points will be described in detail later.

On the basis of a result of the process of determining appropriate editing points, the determination unit 34 determines whether or not the first editing point M1 and the second editing point M2 are appropriate (S13).

When the determination unit 34 determines that the first editing point M1 and the second editing point M2 are not appropriate, the representative value generation unit 32 and the comparison value calculation unit 33 perform a process of searching for an alternative editing point (S14). The process of searching for an alternative editing point will be described in detail later.

On the basis of a result of the process of searching for an alternative editing point, the determination unit 34 determines whether or not to adopt a first alternative editing point M11 (S15).

When the determination unit 34 determines that the alternative editing point is not adopted, the disparity changing unit 36 performs a disparity change process (S16). The disparity change process will be described in detail later.

When the determination unit 34 determines that the first editing point M1 and the second editing point M2 are appropriate (Yes in S13), when the determination unit 34 determines to adopt the alternative editing point (Yes in S15), or when the disparity (S16) ends, the presenting unit 35 adopts respective editing points resulting from the processes (S17). Specifically, when the determination unit 34 determines that the first editing point M1 and the second editing point M2 are appropriate, the presenting unit 35 adopts the first editing point M1 and the second editing point M2 as the editing points. When the determination unit 34 determines to adopt the alternative editing point, the presenting unit 35 adopts the alternative editing point as an editing point. When the disparity changing unit 36 performs the process of changing a disparity between the first editing point M1 and the second editing point M2, the presenting unit 35 adopts, as the editing points, the first editing point M1 and the second editing point M2 resulting from the disparity change process. The presenting unit 35 then presents the adopted editing points to a user.

Figure 3C:
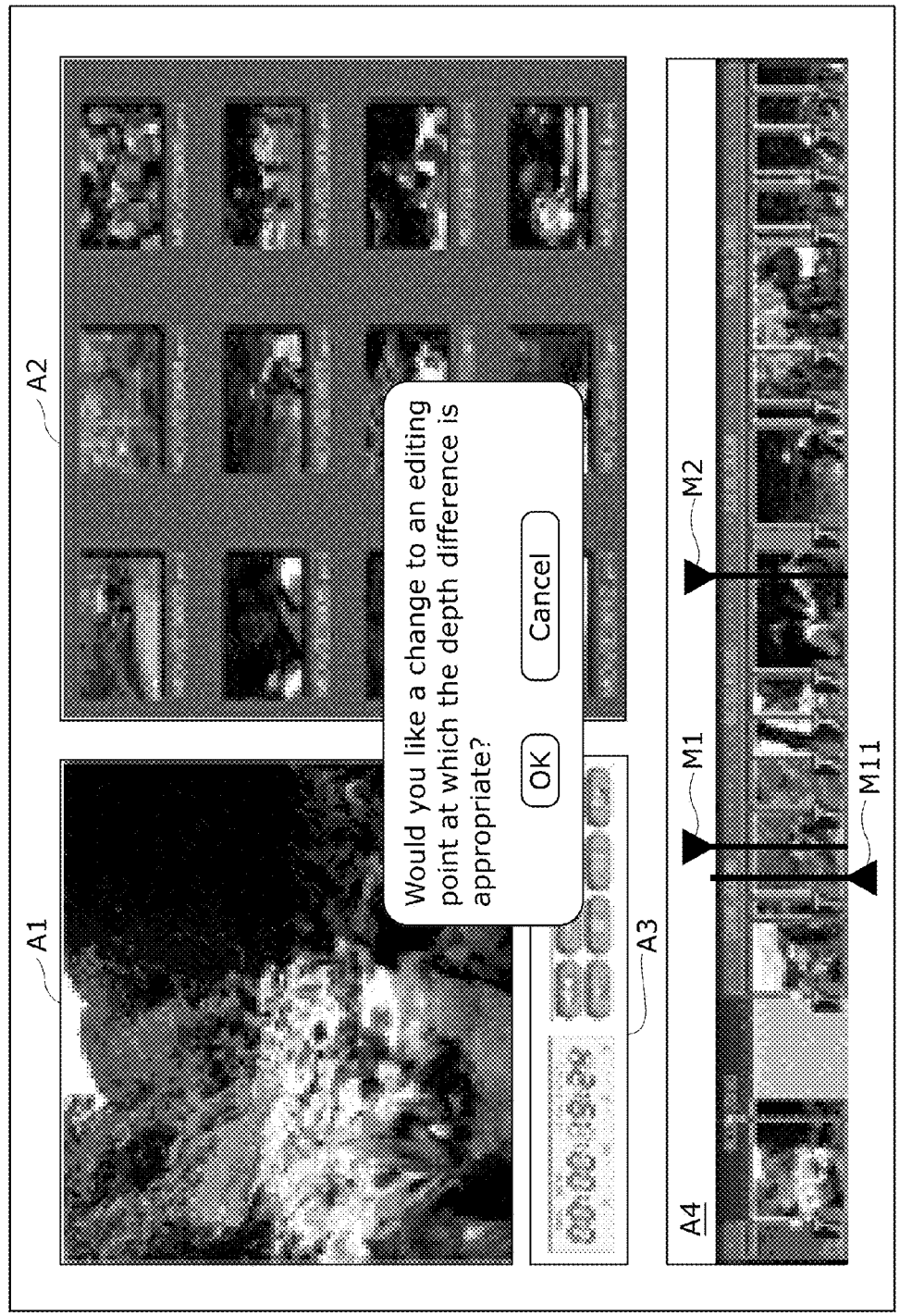
FIG. 3C shows an example of the popup box displayed on the GUI of the video editing software when there is an alternative editing point determined to be appropriate.
Figure 3D:
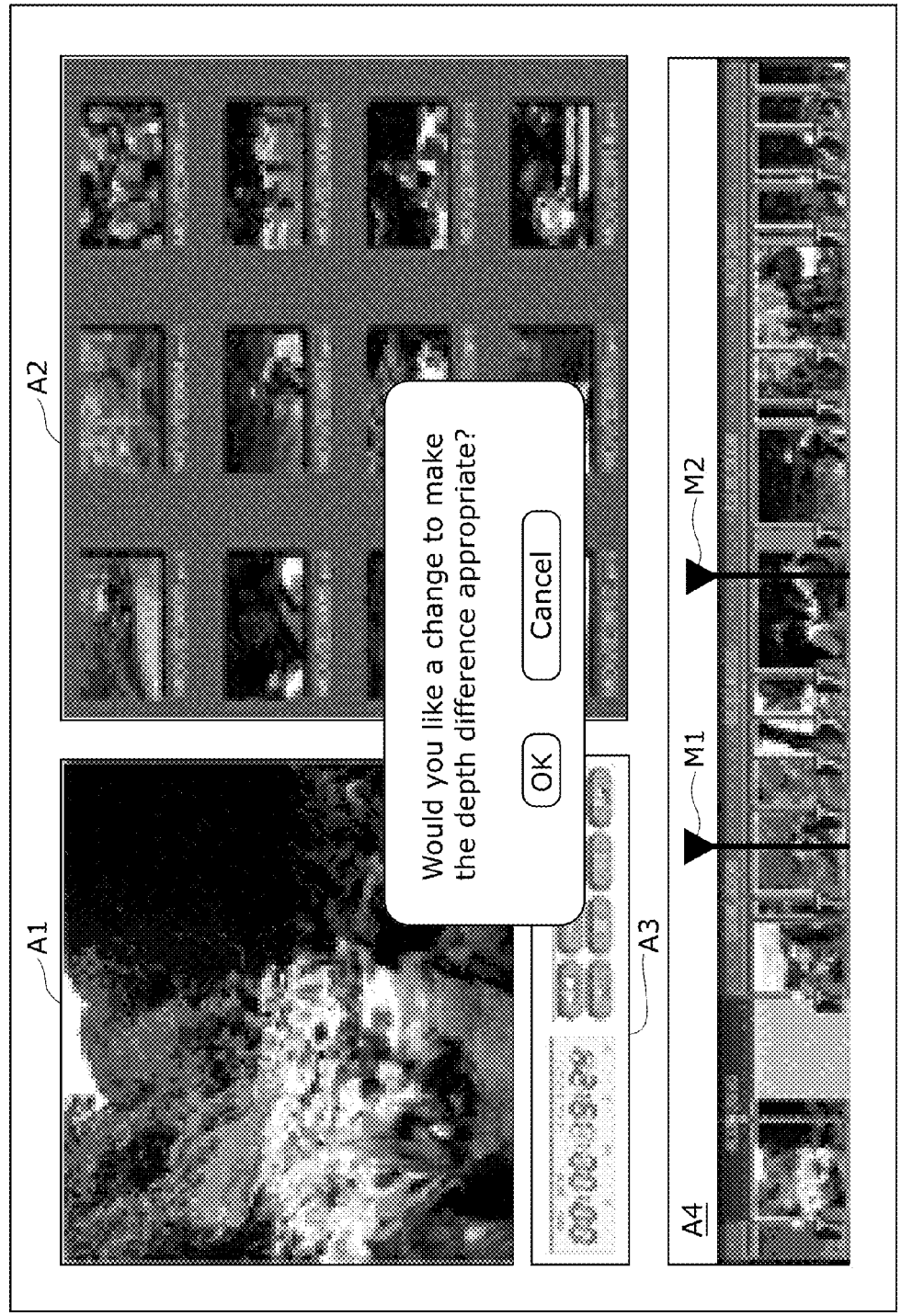
FIG. 3D shows an example of the popup box displayed on the GUI of the video editing software after a disparity change process.

It is to be noted that the presenting unit 35 presents a popup box as shown in FIG. 3B when the result of Step S13 is determined to be Yes, presents a popup box as shown in FIG. 3C when the result of Step S15 is determined to be Yes, and presents a popup box as shown in FIG. 3D when Step S16 is performed. When the OK button is pressed in the popup box of FIG. 3C, the first alternative editing point M11 is determined as a cut point instead of the first editing point M1.

<Process of Determining Appropriate Editing Points>

Figure 5:
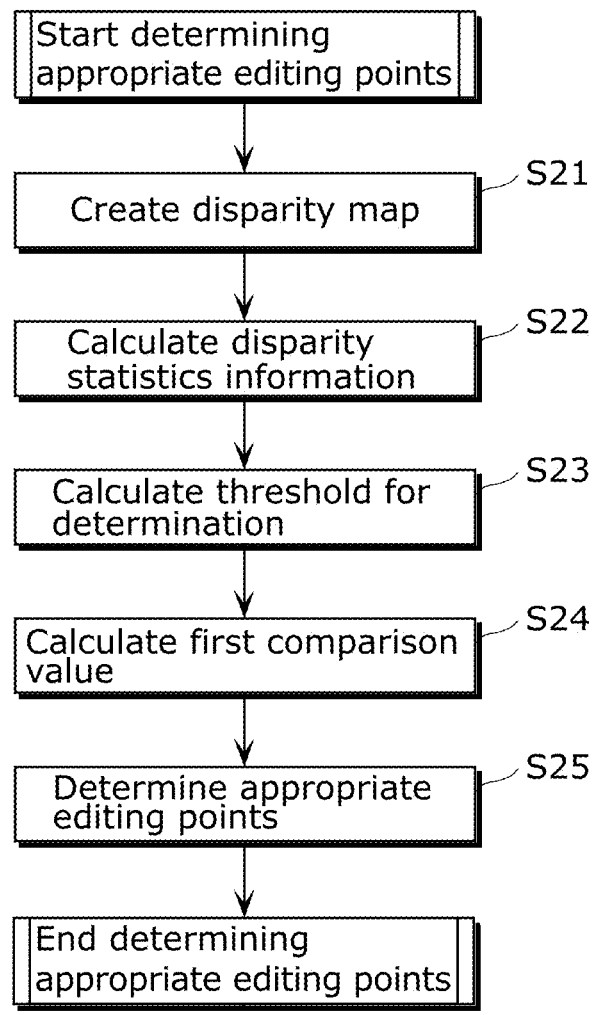
FIG. 5 is a flowchart showing a procedure in a process of determining appropriate editing points according to Embodiment 1.

FIG. 5 is a flowchart showing the procedure in the process of determining appropriate editing points according to this embodiment.

Figure 6A:
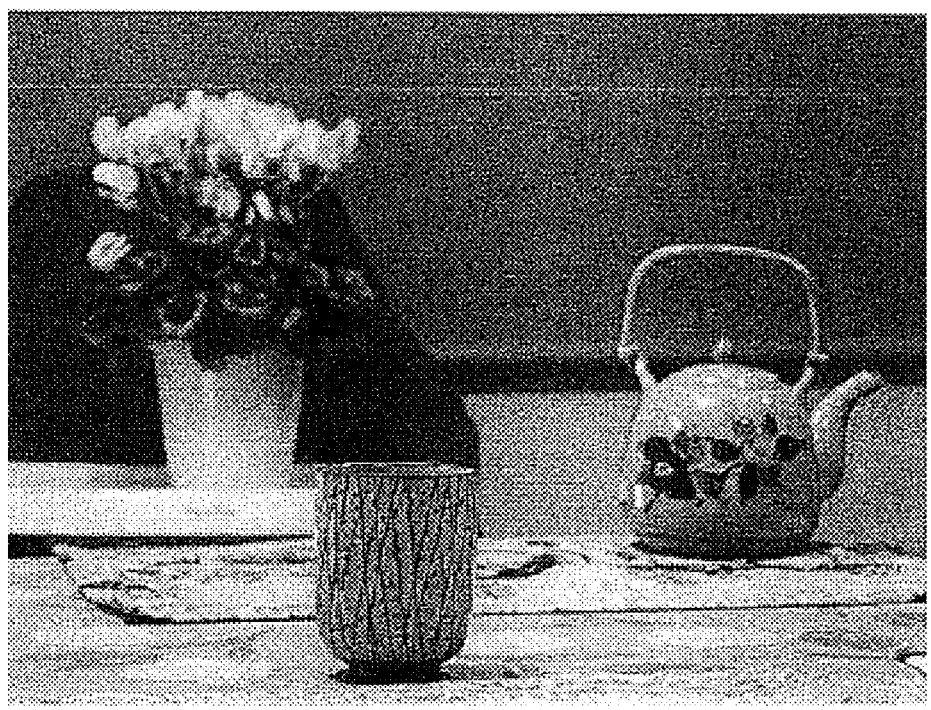
FIG. 6A shows an example of a three-dimensional video frame inputted to a video processing device.
Figure 6B:
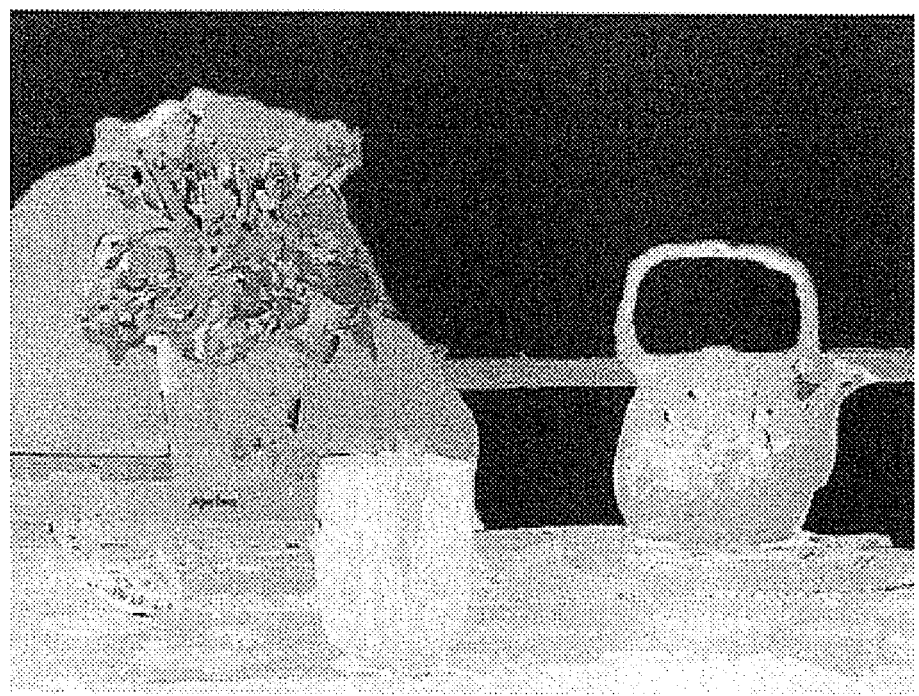
FIG. 6B shows an image of a disparity map created for the inputted three-dimensional video frame of FIG. 6A.

As shown in FIG. 5, in the process of determining appropriate editing points, first, the representative value generation unit 32 creates a disparity map by detecting disparities in a common frame between left-eye video and right-eye video in a three-dimensional video stream (S21). FIG. 6A shows an example of a three-dimensional video frame inputted to a video processing device. FIG. 6B shows an image of a disparity map created for the inputted three-dimensional video frame of FIG. 6A. In the disparity map, as shown in FIG. 6B, a darker (blacker) color indicates a position closer in depth while a lighter (whiter) color indicates a position further away in depth.

After creating the disparity map, the representative value generation unit 32 calculates, as a representative value of disparity information, the maximum value of disparities at the respective pixels of the corresponding frame (S22). For example, the case where the first editing point M1 at a first point in time T1 and the second editing point M2 at a second point in time T2 are selected by a user is described. Here, for the frame at the first editing point M1 at the first point in time T1, disparity information is obtained, and the maximum value (a first representative value) of disparities of the first editing point M1, which is 60 pixels, is obtained. In addition, for the frame at the second editing point M2 at the second point in time T2, disparity information is obtained, and the maximum value (a second representative value) of disparities of the second editing point M2, which is 10 pixels, is obtained.

The determination unit 34 calculates, as the predetermined value, a threshold for determination based on preset screen size information (S23). For example, when the screen size information indicates 50 inches, the threshold for determination will be 40 pixels, while, when the screen size information indicates 25 inches, the threshold for determination will be 20 pixels. In this embodiment, the case where the screen size information indicates 50 inches is described as an example. It is to be noted that, although the screen size information and the threshold for determination have a proportional relationship in this embodiment, the relationship is not limited to the proportional relationship; it may be that the threshold for determination is calculated from the screen size information based on a predetermined expression, or it may be that the threshold for determination is calculated from the screen size information in reference to a predetermined table. It is to be noted that the "screen size information" is information which a user sets first in editing three-dimensional video, and is information on a size of a display, such as a television, which the user assumes is to reproduce the edited three-dimensional video. Specifically, when assuming that the edited three-dimensional video are watched on, for example, a 50-inch television, a user sets the screen size information to 50 inches. As a default setting, the screen size information has been set to, for example, 42 inches in this embodiment.

On the basis of the first representative value and the second representative value which are the respective maximum values of disparities at two editing points, generated by the representative value generation unit 32, the comparison value calculation unit 33 calculates, as the first comparison value, a difference (a first depth difference $\Delta D1$) between the first representative value and the second representative value (S24).

The determination unit 34 determines whether or not the first depth difference $\Delta D1$ calculated by the comparison value calculation unit 33 is greater than the threshold for determination calculated in Step S23 (S25), and the process of determining appropriate editing points ends. By doing so, when the first depth difference $\Delta D1$ is less than or equal to the threshold for determination, the determination unit 34 determines that the first editing point M1 is an editing point which is appropriate (an appropriate editing point), and when the first depth difference $\Delta D1$ is greater than the threshold for determination, the determination unit 34 determines that the first editing point M1 is an editing point which is not appropriate (an inappropriate editing point). Specifically, the determination unit 34 calculates a difference between the maximum value of disparities of the first editing point M1, i.e., 60 pixels, and the maximum value of disparities of the second editing point M2, i.e., 10 pixels, that is, calculates the first depth difference $\Delta D1$ (which is 50 pixels here). In this case, since the first depth difference $\Delta D1$ is greater than the threshold for determination, i.e., 40 pixels, the determination unit 34 determines that the first editing point M1 is an inappropriate editing point.

<Process of Searching for an Alternative Editing Point>

Figure 7:
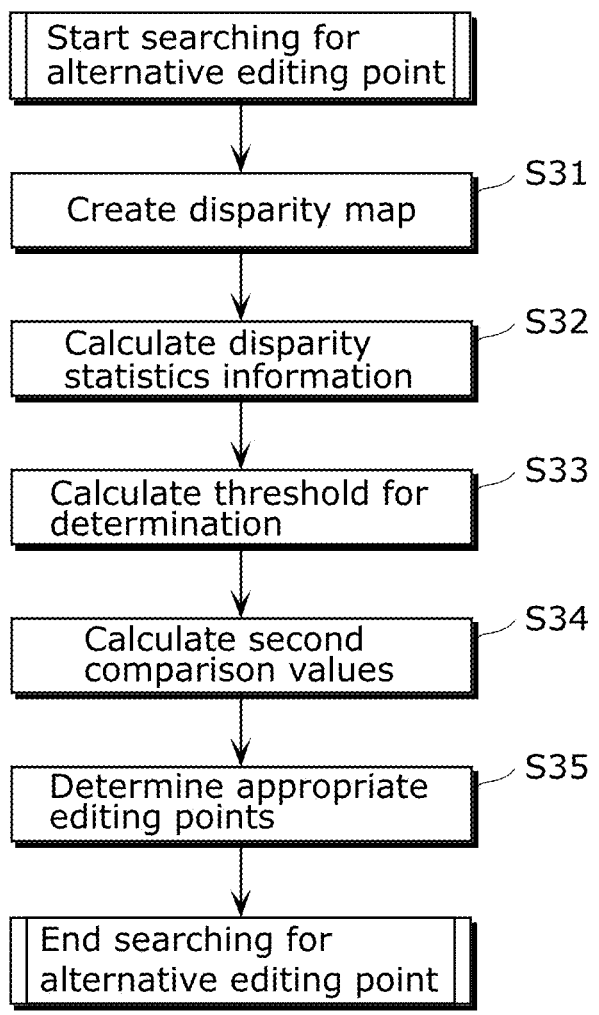
FIG. 7 is a flowchart showing a procedure in a process of searching for an alternative editing point according to Embodiment 1.

FIG. 7 is a flowchart showing the procedure in the process of searching for an alternative editing point according to this embodiment.

As shown in FIG. 7, in the process of searching for an alternative editing point, first, the representative value generation unit 32 lines up, as candidate editing points, six frames in the range (the first predetermined range R1) of three frames both before and after the first point in time except the first editing point M1. The representative value generation unit 32 then detects a disparity between left-eye video and right-eye video at each of the six candidate editing points and thereby creates a disparity map of each of the six frames (S31).

After creating the disparity map of each of the six frames, the representative value generation unit 32 calculates, as a third representative value of disparity information, the maximum value of disparities at the respective pixels of the corresponding frame (S32).

The determination unit 34 calculates, as the predetermined value, a threshold for determination based on preset screen size information (S33), as in the case of Step S23. Although the calculation of a threshold for determination by the determination unit 34 is included also in the process of searching for an alternative editing point in this embodiment, the process of searching for an alternative editing point does not always need to include the calculation of a threshold for determination, and it may be possible to have stored, in the RAM, the threshold for determination calculated previously in the process of determining appropriate editing points and then use the stored threshold for determination.

On the basis of the six third representative values and the second representative value which have been generated by the representative value generation unit 32, the comparison value calculation unit 33 calculates, as the second comparison value, a plurality of differences (six differences in this embodiment) (the second depth differences $\Delta D2$) between the respective third representative values and the second representative value (S34).

The determination unit 34 determines whether or not the six third representative values calculated by the comparison value calculation unit 33 are greater than the threshold for determination calculated in Step S33 (S35), and the process of searching for an alternative editing point ends. Thus, a candidate editing point corresponding to the second depth difference $\Delta D2$ less than or equal to the threshold for determination is determined by the determination unit 34 to be an editing point which is appropriate (an appropriate editing point). A candidate editing point corresponding to the second depth difference $\Delta D2$ greater than the threshold for determination is determined by the determination unit 34 to be an editing point which is not appropriate (an inappropriate editing point). It is to be noted that when there is one appropriate editing point, the presenting unit 35 adopts the appropriate editing point as the first alternative editing point, and when there are a plurality of appropriate editing points, the presenting unit 35 adopts, as the first alternative editing point, an appropriate editing point corresponding to the minimum second depth difference $\Delta D2$ among the appropriate editing points.

<Disparity Change Process>

Figure 8:
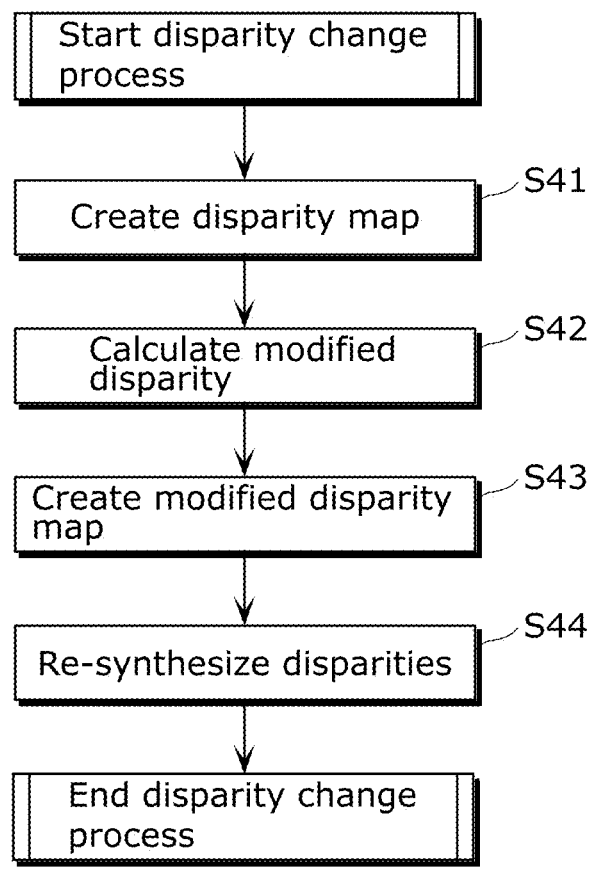
FIG. 8 is a flowchart showing a procedure in the disparity change process according to Embodiment 1.

FIG. 8 is a flowchart showing the procedure in the disparity change process according to this embodiment.

As shown in FIG. 8, in the disparity change process, first, the representative value generation unit 32 creates a disparity map by detecting disparities in a common frame between left-eye video and right-eye video in a three-dimensional video stream (S41). It is to be noted that this disparity map is not always needed to be created by the representative value generation unit 32, and it may be possible to have stored the disparity map created in Step S21 and then use the stored disparity map.

When the first representative value is greater than the second representative value, the disparity changing unit 36 divides, by the first representative value, a reference value obtained by adding a predetermined value to the second representative value, to calculate a first disparity change ratio that is a disparity change ratio at the first point in time. It is to be noted that the "disparity change ratio" is a correction factor by which the disparity changing unit 36 multiplies the disparity between a first point in time and a third point in time in a first scene so that the first representative value at the first point in time in the first scene gradually decreases toward the reference value. The third point in time is a point in time before a disparity change range R2 relative to the first point in time. In this embodiment, the disparity change ratio is 1.0 such that an amount of change relative to the maximum value of disparities at the third point in time is 0, and becomes the first disparity change ratio at the first point in time and is proportional to time. In other words, here, the disparity changing unit 36 derives a disparity change ratio straight line in which the first disparity change ratio is minimum and the disparity change ratio at the third point in time is 1 (which means no changes) (S42). The above has described the case where the first representative value is greater than the second representative value, but in the reverse case, where the first representative value is less than the second representative value, the reference value obtained by subtracting a predetermined value from the second representative value is divided by the first representative value to calculate the first disparity change ratio that is the disparity change ratio at the first point in time.

For disparities at respective pixels in each frame between the first point in time and the third point in time, the disparity changing unit 36 determines, using the disparity change ratio straight line, a disparity change ratio corresponding to the frame and multiplies the disparities at respective pixels in each frame by the disparity change ratio determined for the frame, thereby creating a modified disparity map (S43).

The disparity changing unit 36 renders disparity images based on the modified disparity map and re-synthesizes them as a modified disparity image (S44), and the disparity change process ends.

Specific Example

The above-described video editing process is described in more detail with reference to FIGS. 9 to 15.

Figure 9:
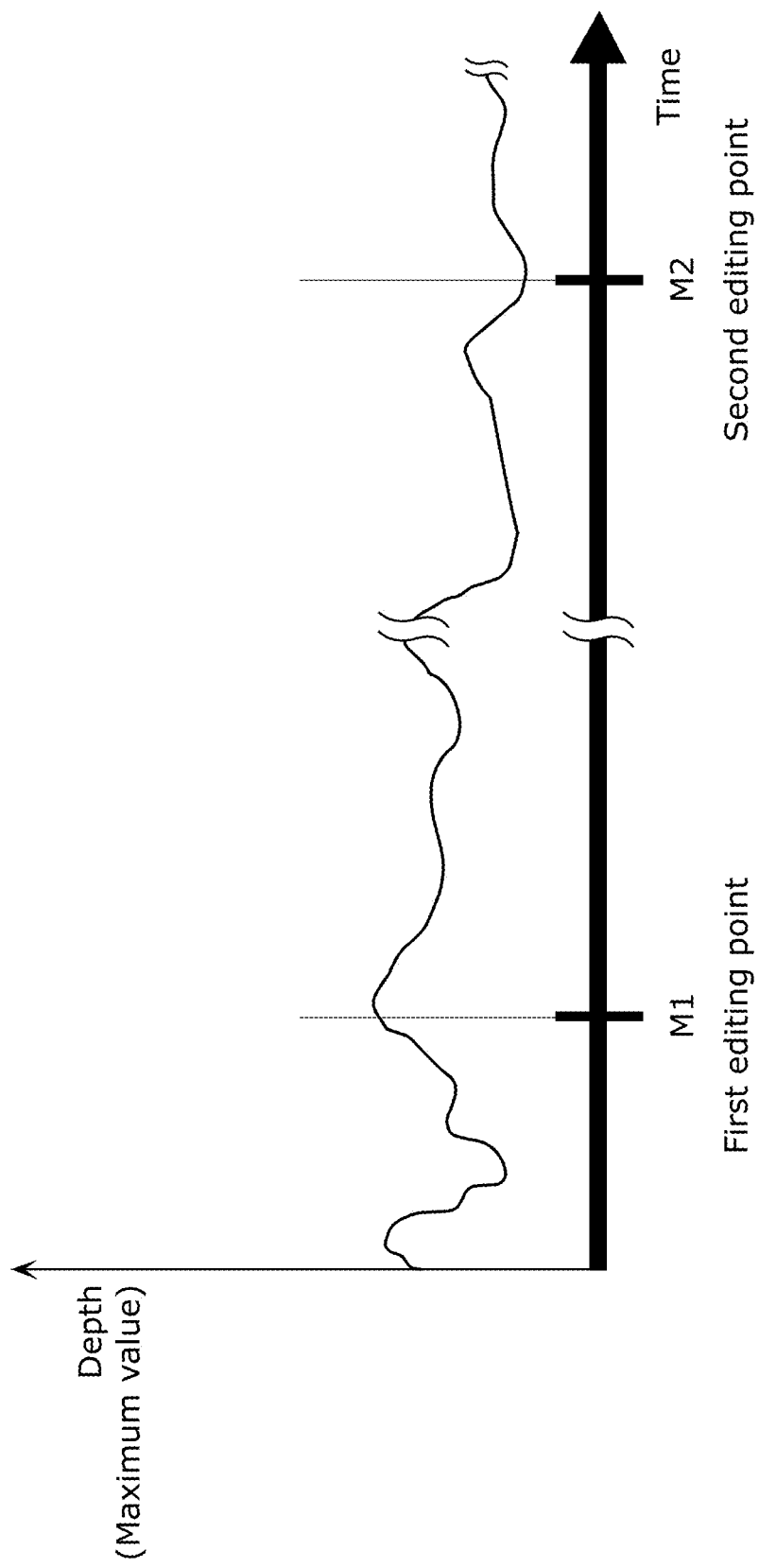
FIG. 9 shows an example of a relationship between time and the maximum value of disparities in the three-dimensional video.

FIG. 9 shows an example of a relationship between time and the maximum value of disparities in the three-dimensional video.

Specifically, FIG. 9 shows a relationship between time and the maximum value of disparities (depth) in certain three-dimensional video. Here, assume that a user has selected the first editing point M1 and the second editing point M2 at the positions as shown in FIG. 9 (S11).

Figure 10:
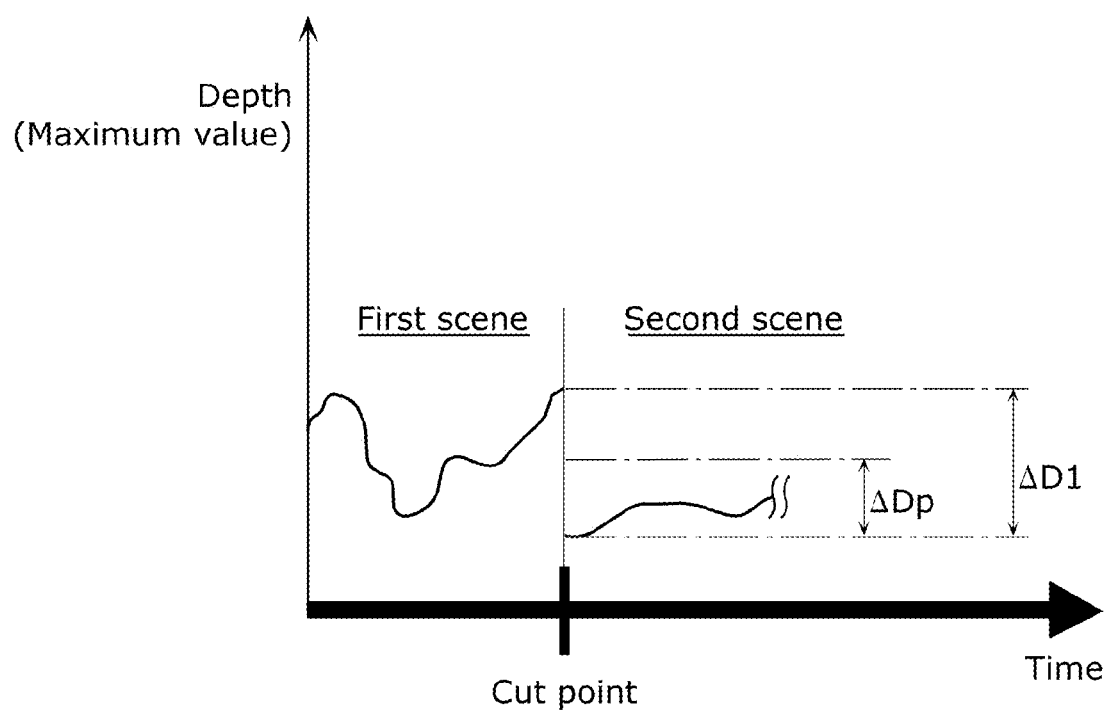
FIG. 10 shows a relationship between a first depth difference and a predetermined value.

The process of determining appropriate editing points is then performed based on the first editing point M1 and the second editing point M2 (S12). In the process of determining appropriate editing points, the first representative value D1 and the second representative value D2 are compared, and it is determined whether or not the first depth difference ΔD1 between the first representative value D1 and the second representative value D2 is less than or equal to a predetermined value ΔDp. As shown in FIG. 10, in this case, the first depth difference ΔD1 is greater than the predetermined value ΔDp (the threshold for determination), and the processing therefore proceeds to the process of searching for an alternative editing point (S13).

Figure 11:
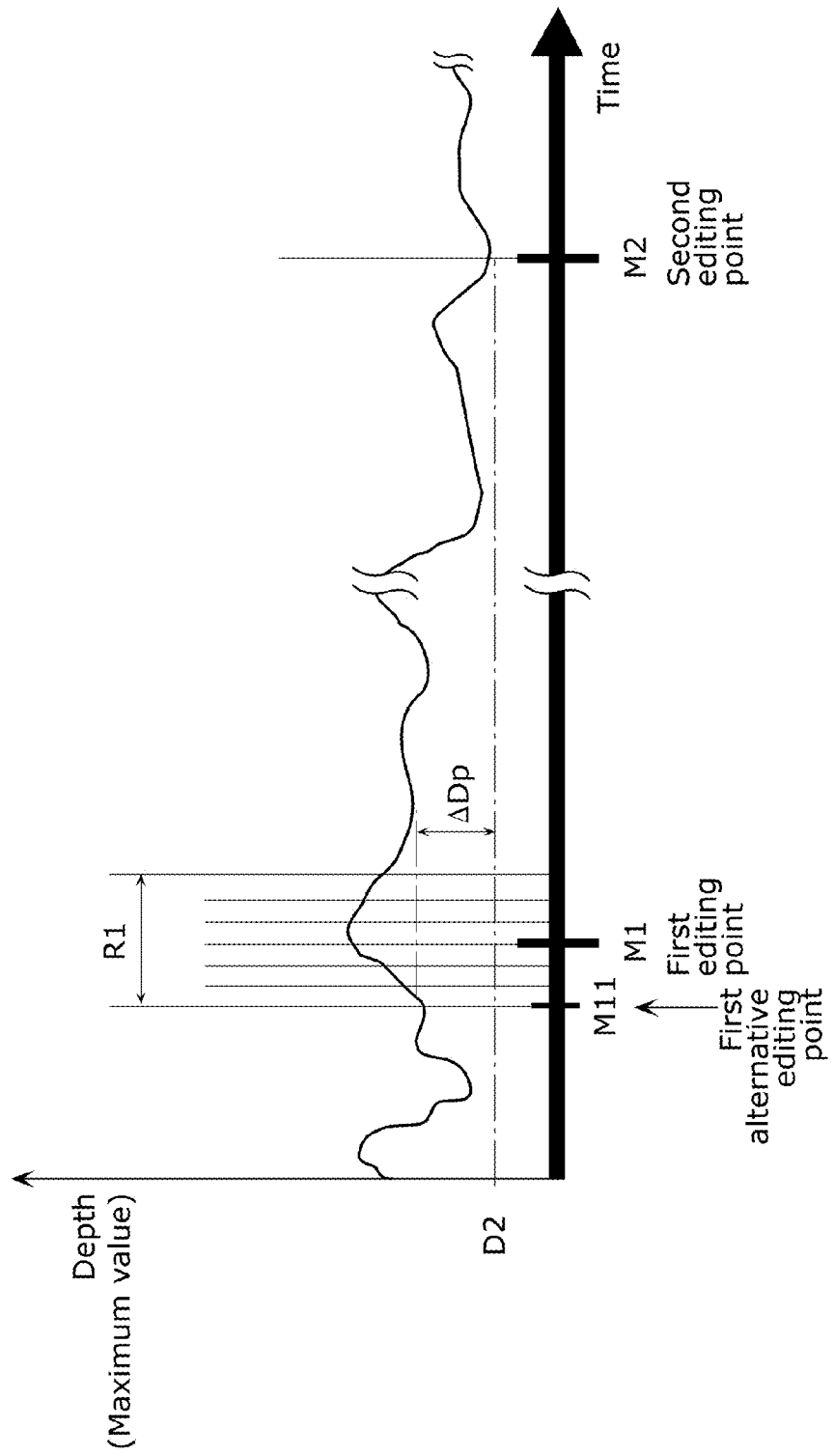
FIG. 11 shows an image of the process of searching for an alternative editing point according to Embodiment 1.
Figure 12:
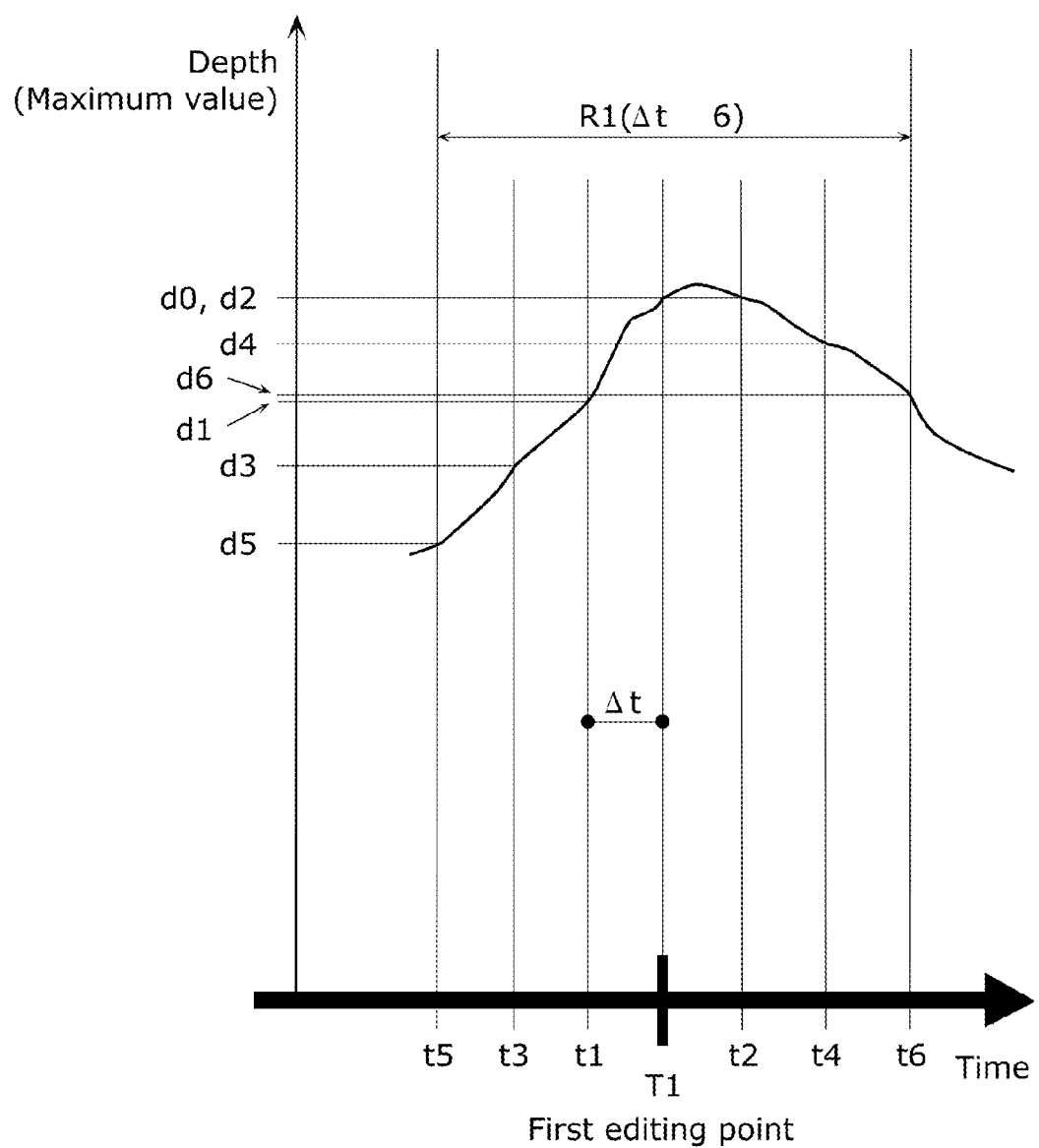
FIG. 12 shows an enlarged image of a part of FIG. 11 which corresponds to a first predetermined range.
Figure 13:
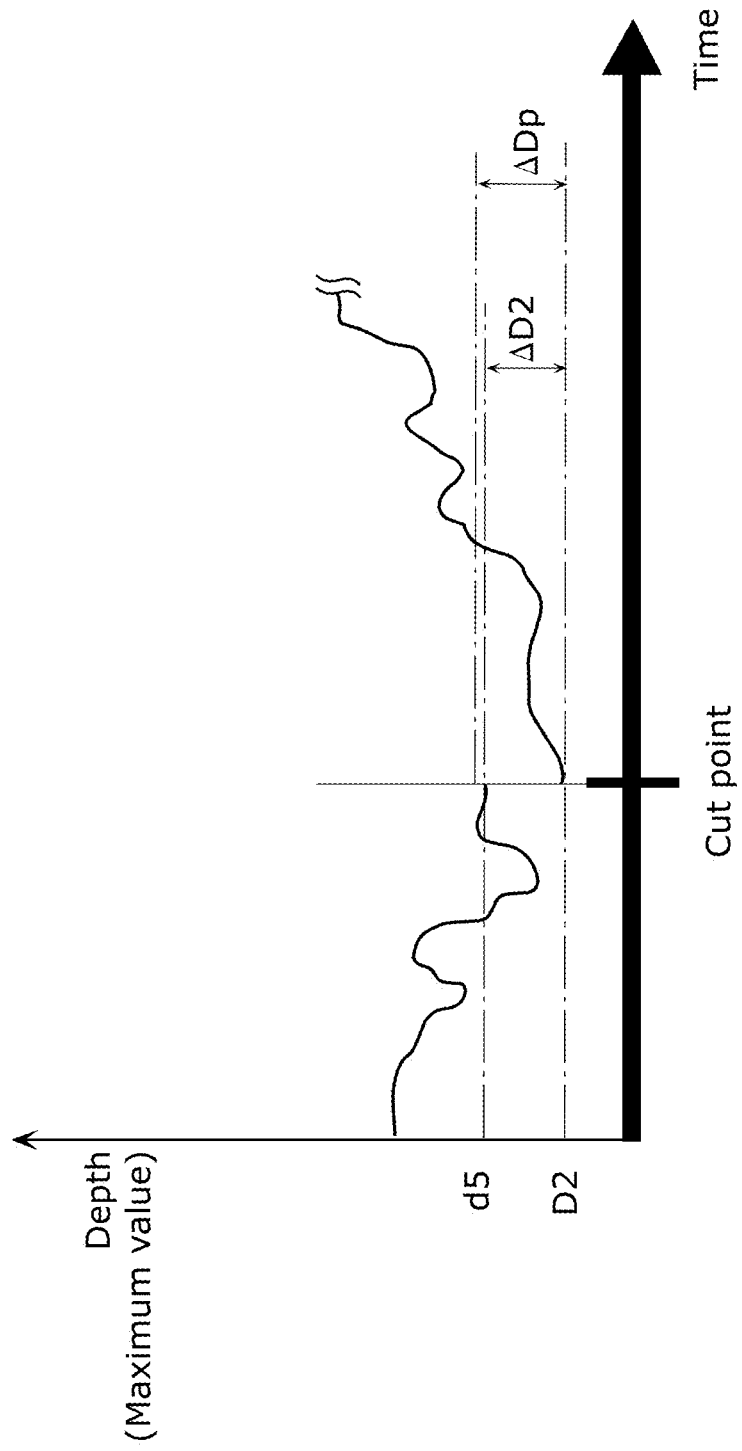
FIG. 13 shows a relationship between a second depth difference and a predetermined value.

In the process of searching for an alternative editing point, the third representative values of three frames both before and after the first point in time T1 as shown in FIG. 11. More specifically, as shown in FIG. 12, the representative value generation unit 32 generates six third representative values d1 to d6 at time t1 to t6 at which three frames both before and after the point in time T1 are located. FIG. 12 shows an enlarged image of a part of FIG. 11 which corresponds to a first predetermined range. As shown in FIG. 12, the three frames on either side of the first point in time T1 have intervals each of which is a temporal distance Δt. In other words, the first predetermined range R1 is equal to Δt×6. It is then determined for each of the six frames whether or not the difference between the third representative value and the second representative value is less than or equal to the predetermined value ΔDp, and in the case of FIGS. 11 and 12, the third representative value d5 corresponding to the time t5 is less than or equal to the threshold for determination, resulting in a determination that the editing point is appropriate as a candidate editing point. Thus, as the first alternative editing point, the time d5 indicating the third representative value d5 is presented to a user by the presenting unit 35. A cut edit based on the adopted time t5 and the second point in time T2 will result in a graph as shown in FIG. 13, naturally with a connection such that the second depth difference ΔD2 at the cut point is less than or equal to the predetermined value ΔDp.

Figure 14:
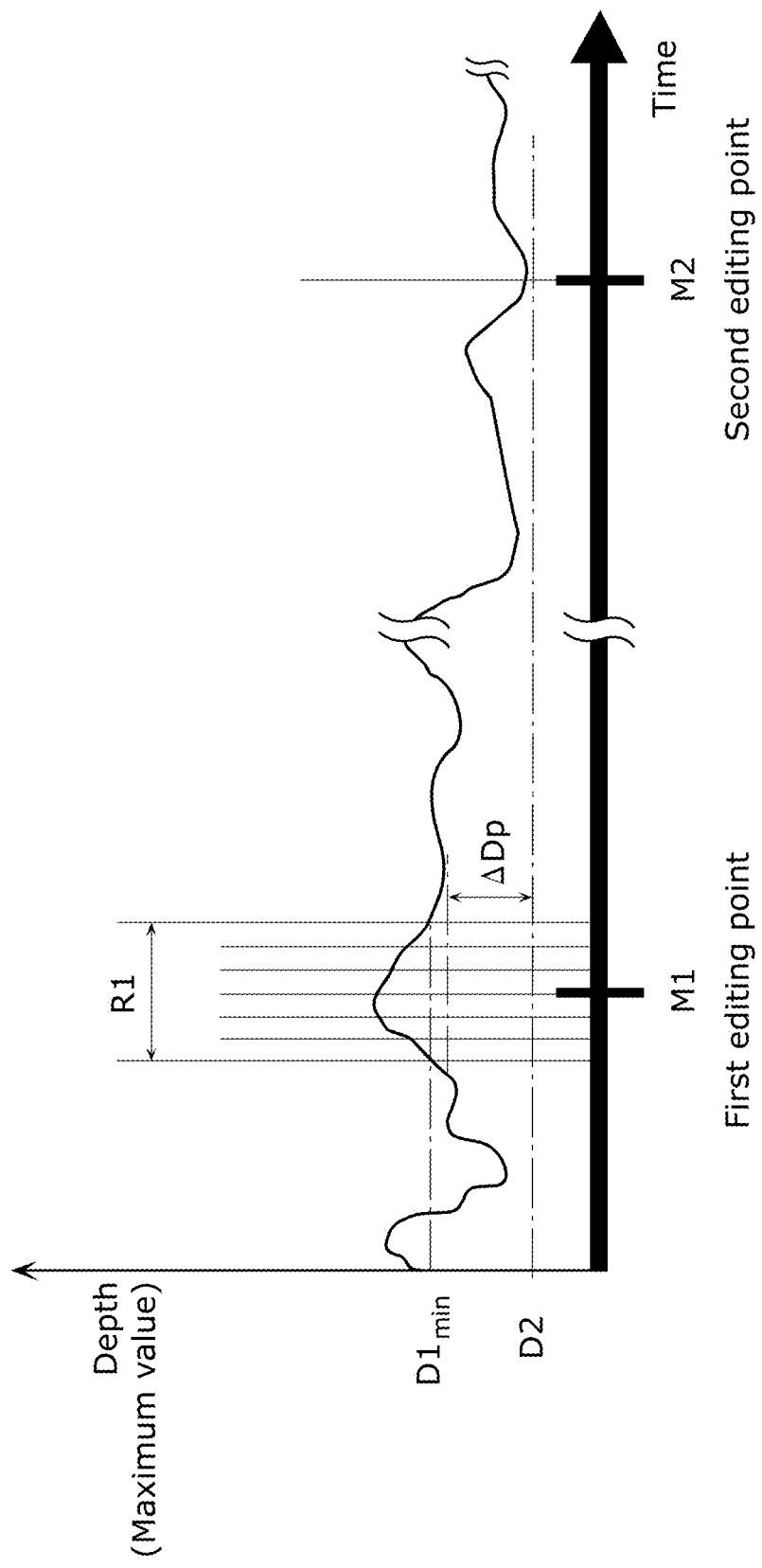
FIG. 14 shows an image of a relationship between time and the maximum value of disparities (depths) in the case where, without adoption of an alternative editing point, the disparity change process is performed by a disparity changing unit.
Figure 15:
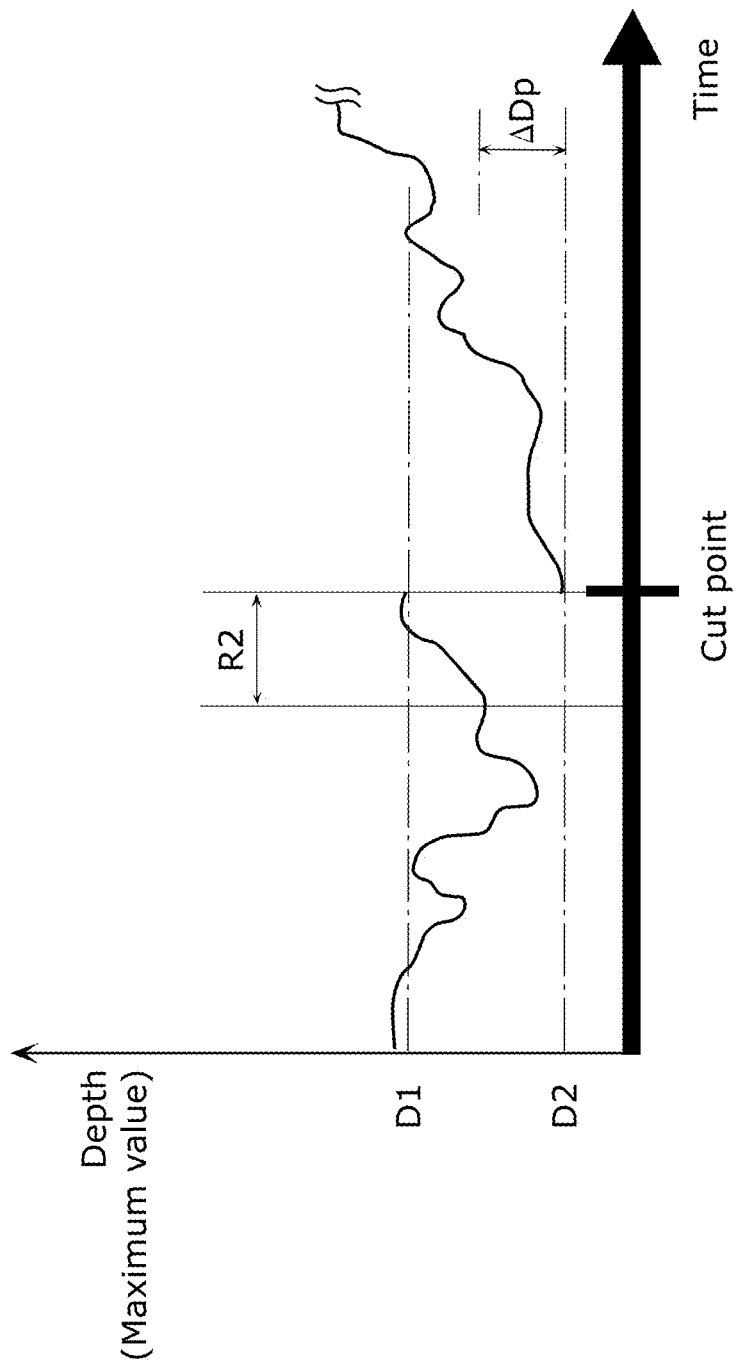
FIG. 15 shows an image at a cut point before the disparity change process is performed.
Figure 16:
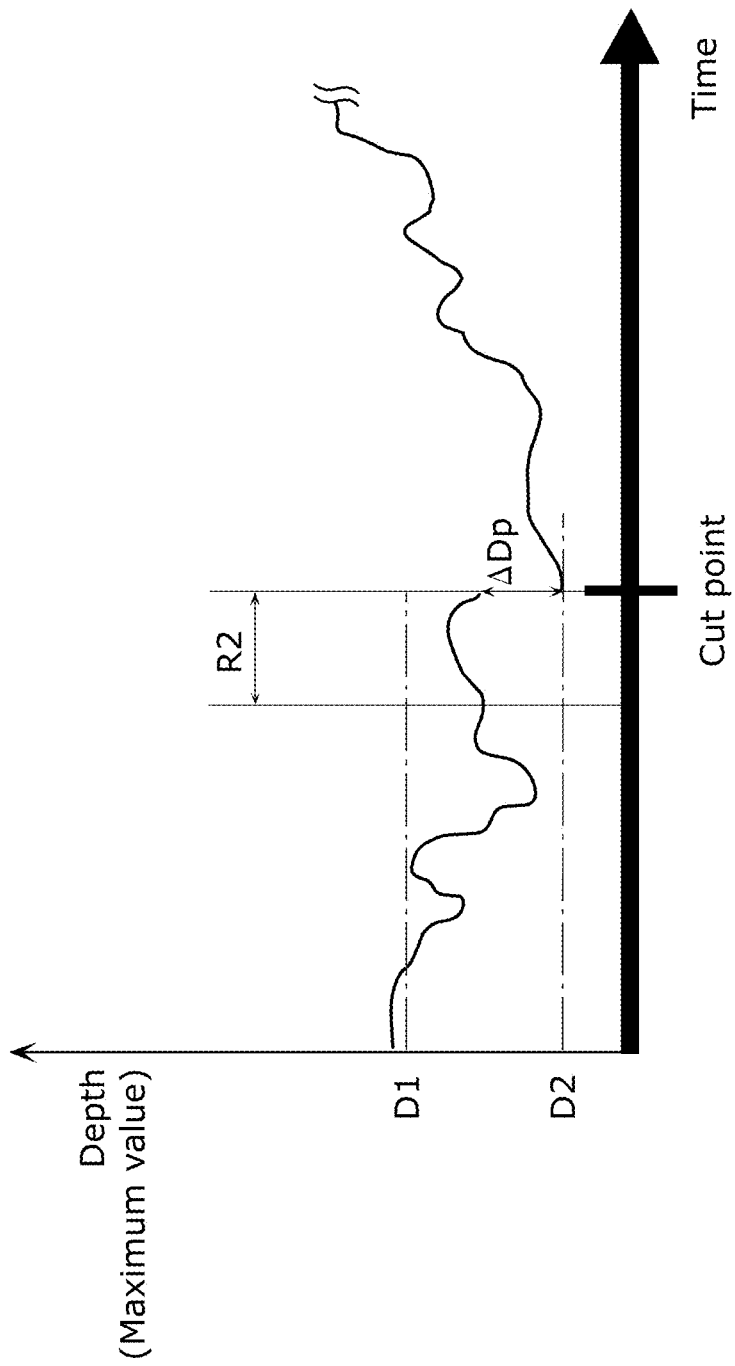
FIG. 16 shows an image at a cut point after the disparity change process is performed.

FIG. 14 shows an image of a relationship between time and the maximum value of disparities (depth) in the case where, without adoption of an alternative editing point, the disparity change process is performed by the disparity changing unit 36. In this case, as shown in FIG. 15, the first editing point M1 and the second editing point M2 are adopted as editing points. Since the difference between the first representative value D1 and the second representative value D2 is greater than the predetermined value ΔDp, the disparity change process is performed to change the maximum value of disparities (depth) before the first editing point M1 as shown in FIG. 16. By doing so, the amount of change in disparity at the cut point after the maximum value of disparities (depth) is changed can be the predetermined value ΔDp, which allows lessening the feeling of strangeness given by these three-dimensional video to viewers.

As above, using the video editing apparatus 100 according to Embodiment 1, a user no longer needs to search for a new editing point. Accordingly, the load on a user in editing three-dimensional video can further be reduced.

Furthermore, using the video editing apparatus 100 according to Embodiment 1, even when there is a plurality of candidate editing points, a candidate editing point corresponding to the smallest second depth difference ΔD2 can be automatically selected as the first alternative editing point M11. Thus, the first alternative editing point M11 at which the depth change is smallest can be adopted as the cut point. This makes it easy for a user to edit three-dimensional video in a way which makes a viewer less likely feel strange.

Furthermore, in the video editing apparatus 100 according to Embodiment 1, in the case where there is no corresponding candidate point, the first disparity information is compressed so that a difference between the first representative value of the first disparity information at the first editing point and the second representative value of the second disparity information at the second editing point is less than or equal to a predetermined value. Thus, even in the case where no candidate editing point around the first editing point can become an alternative, compressing the disparity information enables the editing such that the depth difference will not be great at the editing point selected by a user. A user therefore only needs to select two editing points, i.e., the first editing point and the second editing point, to cut and edit video in a way that the depth does not change much at the cut point.

Furthermore, in the video editing apparatus 100 according to Embodiment 1, the predetermined value and the size of the display unit which displays the three-dimensional video are associated with each other in an expression or a table, which makes it possible to provide the setting such that an appropriate video editing process is performed according to the size of the display unit owned by the user.

Embodiment 2

A video editing apparatus 200 according to Embodiment 2 and the video editing apparatus 100 according to Embodiment 1 are the same in hardware configuration, but different in function structure. Thus, a function structure of the video editing apparatus 200 according to Embodiment 2 is described. The description is made with reference to FIG. 2 because the functional block diagram is the same as that of the video editing apparatus 100 according to Embodiment 1.

FIG. 2 is a block diagram showing a functional structure related to the video editing process in the video editing apparatus 200 according to the present embodiment. In other words, FIG. 2 is a block diagram showing a structure of functions related mainly to the video editing process in the video editing apparatus 200 according to the present embodiment among the functions of the terminal device 1 which are implemented by the hardware configuration shown in FIG. 1.

Since the video editing apparatus 200 is functionally different from the video editing apparatus 100 according to Embodiment 1 in the representative value generation unit 32, the comparison value calculation unit 33, the determination unit 34, and the presenting unit 35, only these units are described.

The representative value generation unit 32 is a processing unit which is implemented using the CPU 10 in FIG. 1, a program, or the like. The representative value generation unit 32 obtains a representative value of first disparity information on disparities of a first frame at the first editing point and a representative value of second disparity information on disparities of a second frame at the second editing point. In the case where the first comparison value is greater than the predetermined value, the representative value generation unit 32 further obtains (i) representative values of third disparity information which are within a first predetermined range R1 including the first point in time and are related to disparities of first candidate editing points at points in time which are other than the first point in time, and (ii) representative values of fourth disparity information which are within a second predetermined range R1 including the second point in time and are related to disparities of second candidate editing points at points in time which are other than the second point in time. It is to be noted that the size of the first predetermined range R1 and the size of the second predetermined range R1 are equal here, but may be different.

The comparison value calculation unit 33 is a processing unit which is implemented using the CPU 10 in FIG. 1, a program, or the like. The comparison value calculation unit 33 calculates, as a first comparison value, a value which is based on the comparison between the representative value of the first disparity information and the representative value of the second disparity information. Specifically, the comparison value calculation unit 33 calculates, as the first comparison value, a first depth difference $\Delta D1$ that is a difference between the maximum value D1 of disparities at all the pixels of the first frame (the representative value of the first disparity information) and the maximum value D2 of disparities at all the pixels of the second frame (the representative value of the second disparity information). Furthermore, the comparison value calculation unit calculates, as a second comparison value $\Delta D2$, a value which is based on the comparison between the representative values of the third disparity information and the representative values of the fourth disparity information. The comparison value calculation unit 33 extracts a first minimum value $D1_{min}$ that is the minimum value among the representative values of the third disparity information, a first maximum value $D1_{MAX}$ that is the maximum value among the representative values of the third disparity information, a second minimum value $D2_{min}$ that is the minimum value among the representative values of the fourth disparity information, and a second maximum value $D2_{MAX}$ that is the maximum value among the representative values of the fourth disparity information. The comparison value calculation unit 33 then calculates a third comparison value $\Delta D3$ that is a value based on the comparison between the first minimum value $D1_{min}$ and the second minimum value $D2_{min}$, a fourth comparison value $\Delta D4$ that is a value based on the comparison between the first minimum value $D1_{min}$ and the second maximum value $D2_{MAX}$, a fifth comparison value $\Delta D5$ that is a value based on the comparison between the first maximum value $D1_{MAX}$ and the second minimum value $D2_{min}$, and a sixth comparison value $\Delta D6$ that is a value based on the comparison between the first maximum value $D1_{MAX}$ and the second maximum value $D2_{MAX}$. It is to be noted that the second comparison value $\Delta D2$ includes the third comparison value $\Delta D3$, the fourth comparison value $\Delta D4$, the fifth comparison value $\Delta D5$, and the sixth comparison value $\Delta D6$.

The determination unit 34 is a processing unit which is implemented using the CPU 10 in FIG. 1, a program, or the like. The determination unit 34 determines whether or not the first comparison value calculated by the comparison value calculation unit 33 is less than or equal to a predetermined value. Furthermore, the determination unit 34 determines whether or not the second comparison value $\Delta D2$ is less than or equal to a predetermined value $\Delta Dp$. Moreover, the determination unit 34 determines whether or not each of the third comparison value $\Delta D3$, the fourth comparison value $\Delta D4$, the fifth comparison value $\Delta D5$, and the sixth comparison value $\Delta D6$, calculated by the comparison value calculation unit 33, is less than or equal to the predetermined value $\Delta Dp$.

The presenting unit 35 is a processing unit which is implemented using the CPU 10 in FIG. 1, a program, or the like. The presenting unit 35 presents a message prompting a user to change at least one of the first editing point and the second editing point when the determination unit determines that the first comparison value is greater than the predetermined value. When the second comparison value $\Delta D2$ is less than or equal to the predetermined value $\Delta Dp$, the presenting unit 35 further presents, to a user, a first candidate editing point as a first alternative editing point and a second candidate editing point as a second alternative editing point. When one of the third comparison value $\Delta D3$, the fourth comparison value $\Delta D4$, the fifth comparison value $\Delta D5$, and the sixth comparison value $\Delta D6$ is less than or equal to the predetermined value $\Delta Dp$, the presenting unit 35 further refers to the first candidate editing point and the second candidate editing point which correspond to one of the third comparison value $\Delta D3$, the fourth comparison value $\Delta D4$, the fifth comparison value $\Delta D5$, and the sixth comparison value $\Delta D6$, which is less than or equal to the predetermined value $\Delta Dp$, and presents, to a user, the first candidate editing point as the first alternative editing point and the second candidate editing point as the second alternative editing point. When more than one of the third comparison value $\Delta D3$, the fourth comparison value $\Delta D4$, the fifth comparison value $\Delta D5$, and the sixth comparison value $\Delta D6$ is less than or equal to the predetermined value $\Delta Dp$, the presenting unit 35 further refers to the first candidate editing point and the second candidate editing point which correspond to the smallest comparison value among the comparison values less than or equal to the predetermined value $\Delta Dp$, and presents, to a user, the first candidate editing point as the first alternative editing point and the second candidate editing point as the second alternative editing point.

Next, the procedure in the video editing process of the video editing apparatus 200 according to Embodiment 2 configured as above is described. The video editing apparatus 200 according to Embodiment 2 is different from the video editing apparatus 100 according to Embodiment 1 in the process of searching for an alternative editing point. Specifically, while the video editing apparatus 100 according to Embodiment 1 searches for the first alternative editing point corresponding to the first editing point in the process of searching for an alternative editing point, the video editing apparatus 200 according to Embodiment 2 searches for the second alternative editing point corresponding to the second editing point in addition to the first alternative editing point corresponding to the first editing point. In other words, while the video editing apparatus 100 according to Embodiment 1 searches for the first alternative editing point corresponding to the first editing point with the second editing point fixed, the video editing apparatus 200 according to Embodiment 2 searches for alternative editing points corresponding to both, instead of one, of the first editing point and the second editing point. Thus, only the process of searching for an alternative editing point is described here.

Figure 17:
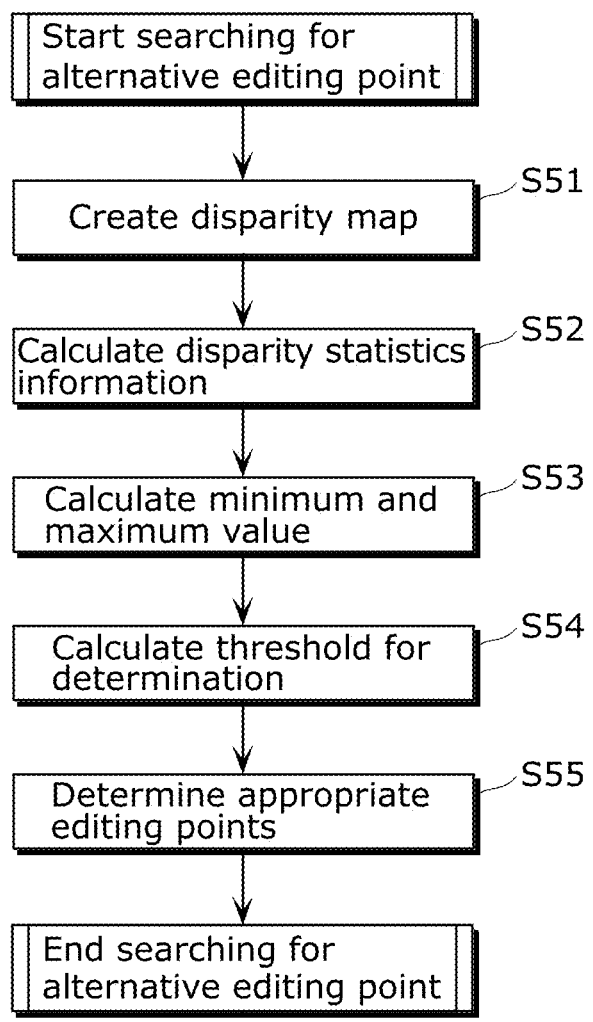
FIG. 17 is a flowchart showing a procedure in a process of searching for an alternative editing point according to Embodiment 2.

FIG. 17 is a flowchart showing the procedure in the process of searching for an alternative editing point according to Embodiment 2. As shown in FIG. 17, in the process of searching for an alternative editing point, first, the representative value generation unit 32 lines up, as first candidate editing points, six frames in the range (the first predetermined range R1) of three frames both before and after the first point in time T1 except the first editing point M1. In addition, the representative value generation unit 32 lines up, as second candidate editing points, six frames which are in the first predetermined range R1 including the second point in time T2 and are other than the second editing point M2. The representative value generation unit 32 then detects a difference in disparity between left-eye video and right-eye video at each of the six first candidate editing points and thereby creates a disparity map of each of the frames corresponding to the six first candidate editing points. Likewise, the representative value generation unit 32 detects a difference in disparity between left-eye video and right-eye video at each of the six second candidate editing points and thereby creates a disparity map of each of the frames corresponding to the six second candidate editing points (S51).

After creating the disparity map of each of the frames corresponding to the six first candidate editing points and the six second candidate editing points, the representative value generation unit 32 calculates, for each of the frames corresponding to the six first candidate editing points, the maximum value of disparities at the respective pixels of the frame as a third representative value of disparity information, and calculates, for each of the frames corresponding to the six second candidate editing points, the maximum value of disparities at the respective pixels of the frame as a fourth representative value of disparity information (S52).

The comparison value calculation unit 33 extracts the first minimum value $D1_{min}$ that is the minimum value among the six third representative values, the first maximum value $D1_{MAX}$ that is the maximum value among the six third representative values, the second minimum value $D2_{min}$ that is the minimum value among the six fourth representative values, and the second maximum value $D2_{MAX}$ that is the maximum value among the six fourth representative values (S53).

The determination unit 34 calculates, as the predetermined value, a threshold for determination based on preset screen size information (S54), as in the case of Step S23.

The comparison value calculation unit 33 calculates, as the third comparison value, a third depth difference $\Delta D3$ that is a difference between the first minimum value $D1_{min}$ and the second minimum value $D2_{min}$, calculates, as the fourth comparison value, a fourth depth difference $\Delta D4$ that is a difference between the first minimum value $D1_{min}$ and the second maximum value $D2_{MAX}$, calculates, as the fifth comparison value, a fifth depth difference $\Delta D5$ that is a difference between the first maximum value $D1_{MAX}$ and the second minimum value $D2_{min}$, and calculates, as the sixth compari-son value, a sixth depth difference $\Delta D6$ that is a difference between the first maximum value $D1_{MAX}$ and the second maximum value $D2_{MAX}$. Furthermore, the determination unit 34 determines whether or not each of the third depth difference $\Delta D3$, the fourth depth difference $\Delta D4$, the fifth depth difference $\Delta D5$, and the sixth depth difference $\Delta D6$ is less than or equal to the threshold for determination (the predetermined value $\Delta Dp$) (S55), and the process of searching for an alternative editing point ends. Thus, the first candidate editing point and the second candidate editing point which correspond to a depth difference less than or equal to the threshold for determination among the third depth difference $\Delta D3$, the fourth depth difference $\Delta D4$, the fifth depth difference $\Delta D5$, and the sixth depth difference $\Delta D6$ are determined by the determination unit 34 to be editing points which are appropriate (appropriate editing points). Candidate editing points which correspond to a depth difference greater than the threshold for determination among the third depth difference $\Delta D3$, the fourth depth difference $\Delta D4$, the fifth depth difference $\Delta D5$, and the sixth depth difference $\Delta D6$ are determined by the determination unit 34 to be editing points which are not appropriate (inappropriate editing points). It is to be noted that when there is one appropriate editing point, the presenting unit 35 adopts the appropriate editing point as the first alternative editing point and the second alternative editing point, and when there are a plurality of appropriate editing points, the presenting unit 35 adopts, as the first alternative editing point and the second alternative editing point, an appropriate editing point corresponding to the minimum depth difference among the appropriate editing points.

Specific Example

The above-described video editing process is described in more detail with reference to FIGS. 18 and 19A to 19D.

Here, for describing the process of searching for an alternative editing point different from Embodiment 1, the case where the determination unit 34 determines in Step S13 that the first editing point M1 and the second editing point M2 are not appropriate is described as an example.

Figure 18:
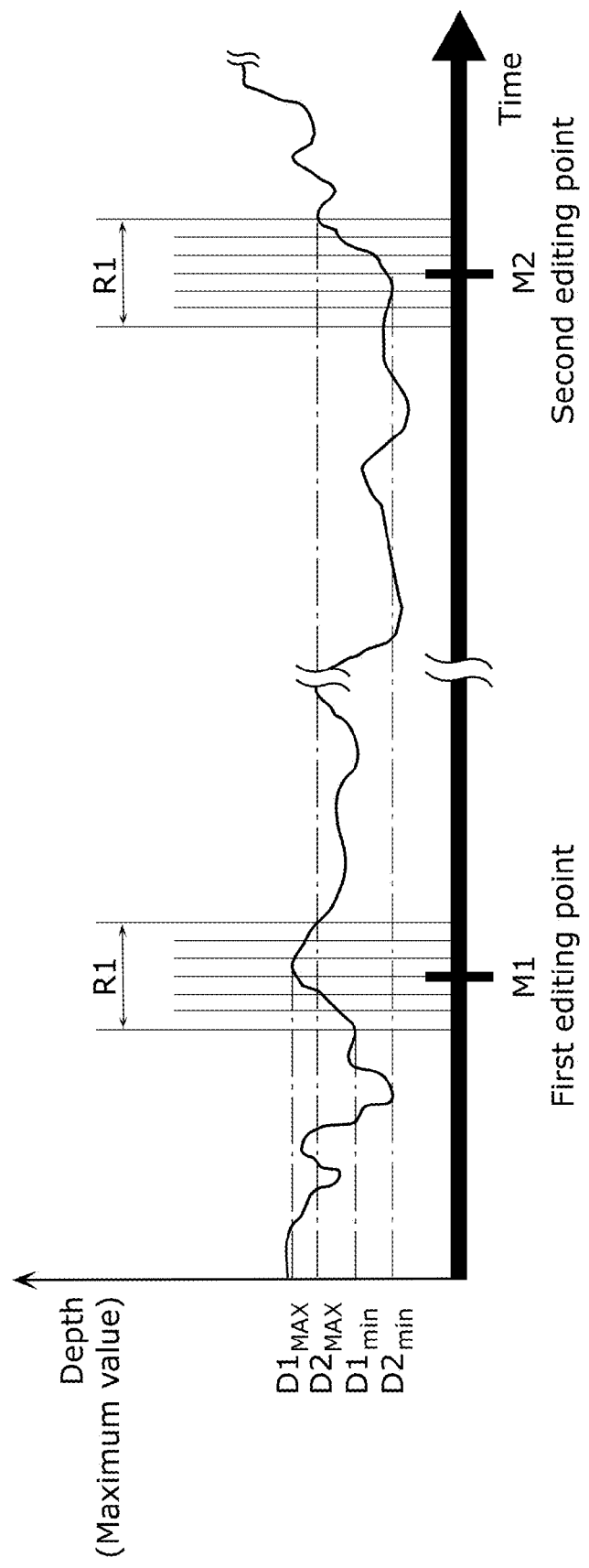
FIG. 18 shows an image of the process of searching for an alternative editing point according to Embodiment 2.
Figure 19A:
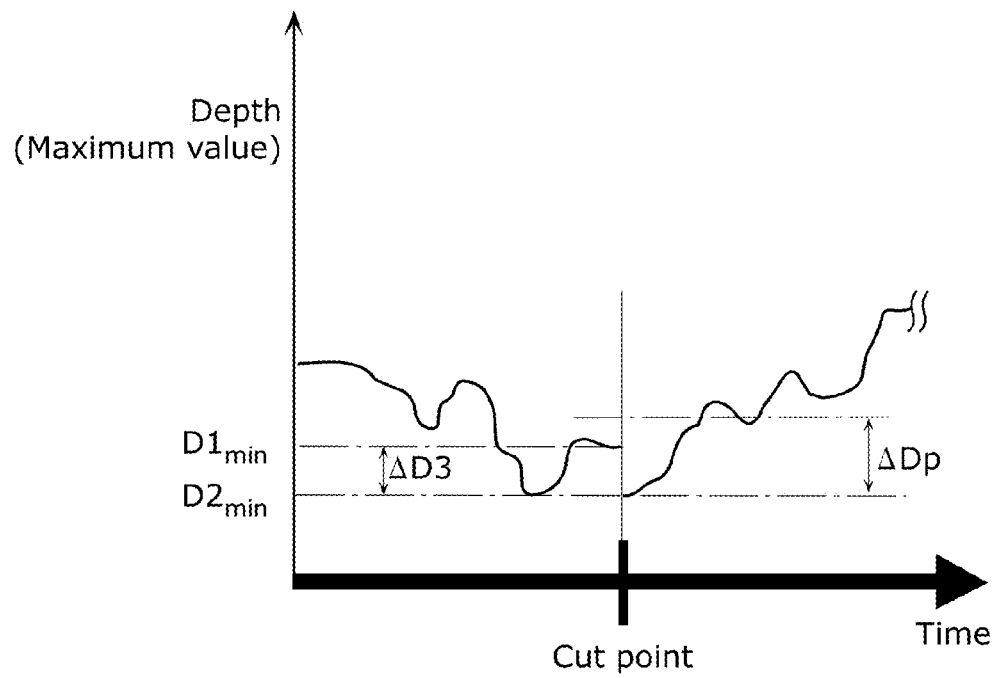
FIG. 19A shows a relationship between a third depth difference and a predetermined value.
Figure 19B:
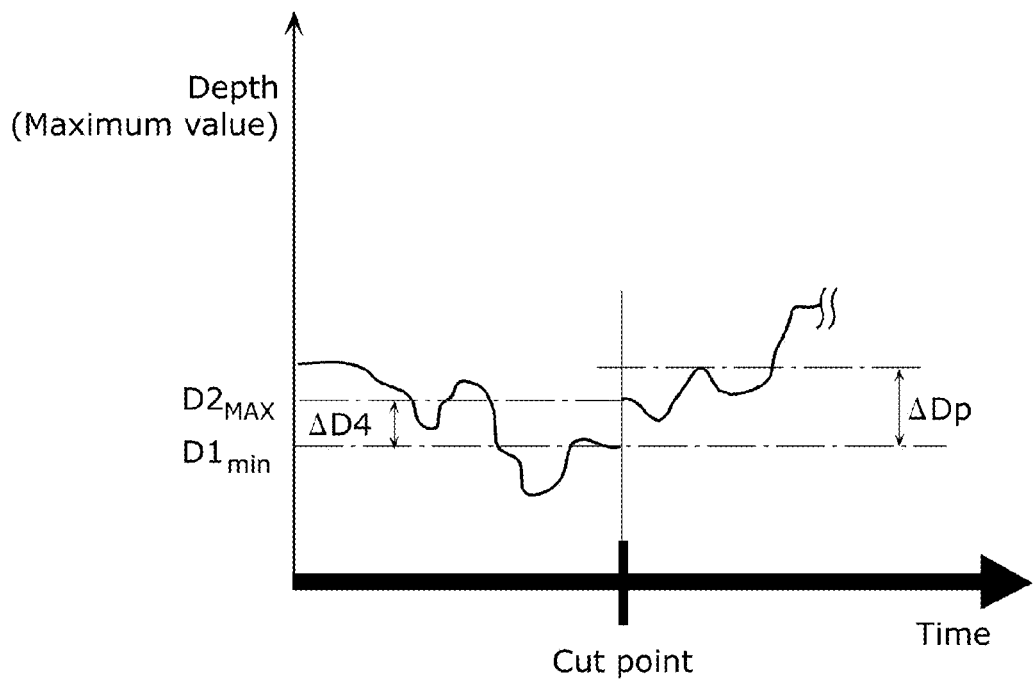
FIG. 19B shows a relationship between a fourth depth difference and a predetermined value.
Figure 19C:
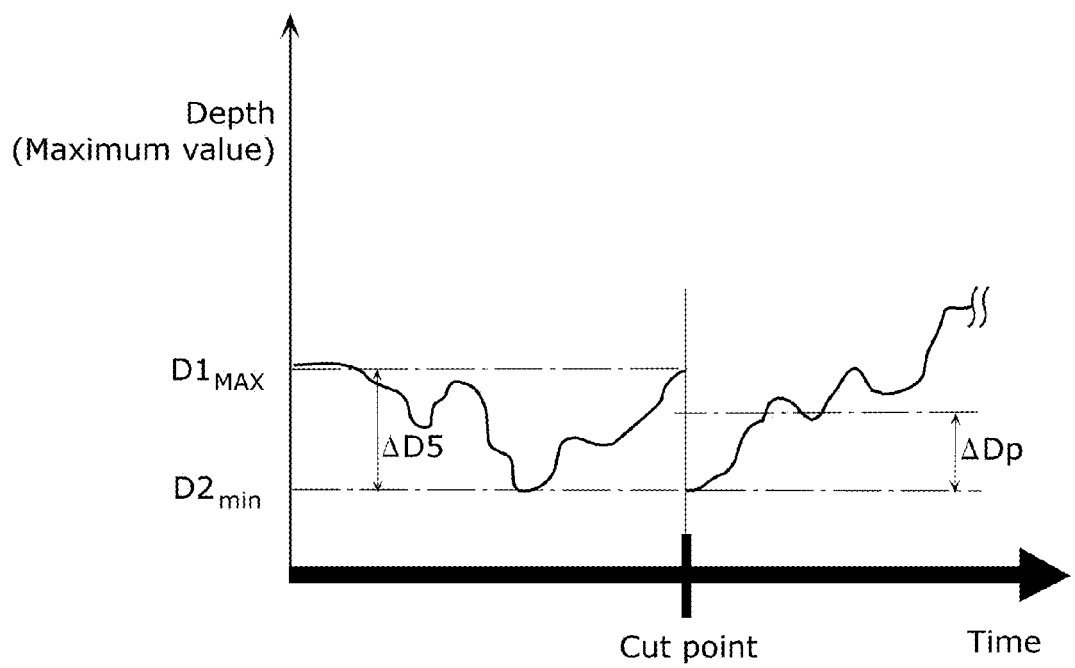
FIG. 19C shows a relationship between a fifth depth difference and a predetermined value.
Figure 19D:
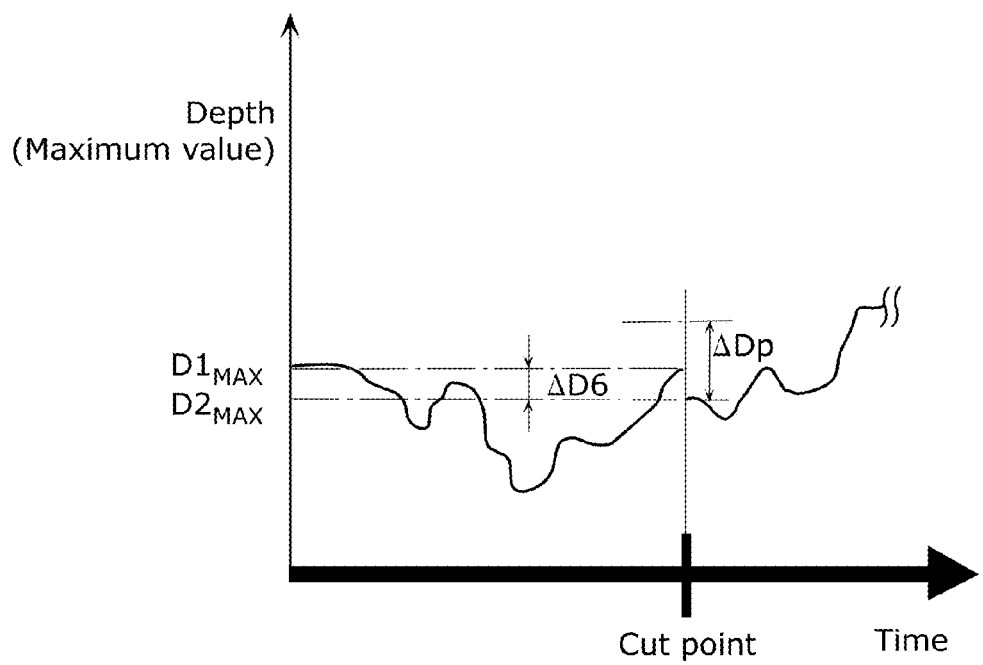
FIG. 19D shows a relationship between a sixth depth difference and a predetermined value.

Subsequently, in the process of searching for an alternative editing point, as shown in FIG. 18, the comparison value calculation unit 33 calculates the first minimum value $D1_{min}$ and the first maximum value $D1_{MAX}$ based on the third representative values of three frames both before and after the first point in time T1, and calculates the second minimum value $D2_{min}$ and the second maximum value $D2_{MAX}$ based on the fourth representative values of three frames both before and after the second point in time T2. This is followed by comparing the third depth difference $\Delta D3$ and the predetermined value $\Delta Dp$ as shown in FIG. 19A, comparing the fourth depth difference $\Delta D4$ and the predetermined value $\Delta Dp$ as shown in FIG. 19B, comparing the fifth depth difference $\Delta D5$ and the predetermined value $\Delta Dp$ as shown in FIG. 19C, and comparing the sixth depth difference $\Delta D6$ and the predetermined value $\Delta Dp$ as shown in FIG. 19D. FIGS. 19A to 19D show images of comparison between (i) the third depth difference $\Delta D3$, the fourth depth difference $\Delta D4$, the fifth depth difference $\Delta D5$, and the sixth depth difference $\Delta D6$ and (ii) the predetermined value $\Delta Dp$, which images result from cutting at the first candidate editing points and the second candidate editing points which correspond to the third depth difference $\Delta D3$, the fourth depth difference $\Delta D4$, the fifth depth difference $\Delta D5$, and the sixth depth difference $\Delta D6$. In the case shown in FIGS. 19A to 19D, the third depth difference $\Delta D3$, the fourth depth difference $\Delta D4$, and the sixth depth difference $\Delta D6$ are less than or equal to the predetermined value ΔDp. Accordingly, in this case, the determination unit 34 determines that the first candidate editing points and the second candidate editing points which correspond to the third depth difference ΔD3, the fourth depth difference ΔD4, and the sixth depth difference ΔD6 are editing points which are appropriate (appropriate editing points). The presenting unit 35 then adopts, as the first alternative editing point and the second alternative editing point, the first candidate editing point and the second candidate editing point which correspond to the six depth difference ΔD6 which is smallest among the third depth difference ΔD3, the fourth depth difference ΔD4, and the sixth depth difference ΔD6.

As above, using the video editing apparatus 200 according to Embodiment 2, a user no longer needs to search for a new editing point. Furthermore, since two alternative editing points, i.e., the first alternative editing point and the second alternative editing point, are searched for, an editing point with a high degree of flexibility can be selected as the cut point. Accordingly, the load on a user in editing three-dimensional video can further be reduced.

Furthermore, using the video editing apparatus 200 according to Embodiment 2, even when there is a plurality of candidate editing points, a set of candidate editing points corresponding to the smallest comparison value can be automatically selected as the first alternative editing point and the second alternative editing point. Thus, the first alternative editing point and the second alternative editing point between which the depth change is smallest can each be adopted as the cut point. This makes it easy for a user to edit three-dimensional video in a way which makes a viewer less likely feel strange.

The video editing apparatus according to implementations of the present invention has been described above based on the embodiments, the present invention is not limited to these embodiments.

This means that the embodiments disclosed here should be construed as illustrative and not restrictive in all aspects. The scope of the present invention is indicated by the appended claims rather than the foregoing description and intended to cover all modifications within the literal and equivalent scope of the claims.

Figure 20:
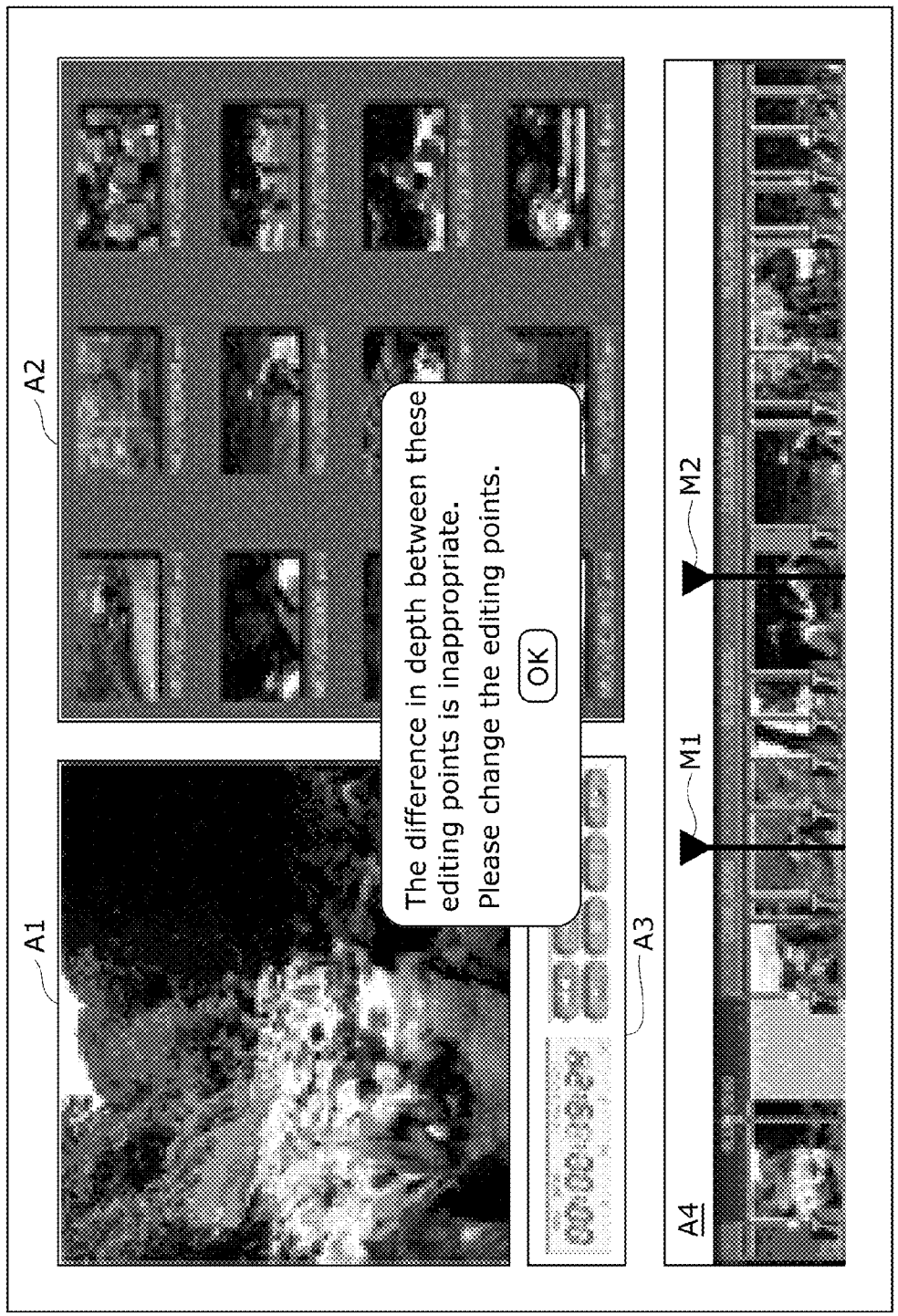
FIG. 20 shows an example of a popup box displayed on the GUI of the video editing software when editing points are determined to be inappropriate.

Although the presenting unit 35 presents an alternative editing point obtained based on a result of the determination made by the determination unit 34 that each depth difference is less than or equal to the predetermined value ΔDp, or presents an editing point obtained as a result of the disparity change process performed by the disparity changing unit 36 in the above embodiments, it may be that, instead of these embodiments, in the case where the determination in Step S13 is No, a popup message prompting a user to change the first editing point or the second editing point is displayed as shown in FIG. 20. With this, a user can select editing points between which the depth change is not significant, by changing at least one of the first editing point M1 and the second editing point M2. Accordingly, it is possible to eliminate the user's tasks needed to be done looking at shot images in editing three-dimensional video, such as an ingenious shooting procedure and a careful selection of materials before and after a cut point, so as not to cause a change in depth of an object at the cut point, with the result that the load on a user in editing three-dimensional video can be reduced.

Although the above video editing apparatus 100 according to Embodiment 1 searches for the first alternative editing point corresponding to the first editing point with the second editing point fixed, the reverse case is also possible, that is, it may search for the second alternative editing point corresponding to the second editing point with the first editing point fixed.

Although the maximum value of disparities at the respective pixels of a frame is used as the representative value of disparity information in the above embodiments, the representative value is not limited to the maximum value of the disparities and may be the mean value of the disparities at the respective pixels or the variance in all the pixels of the frame, and it may be that a user can set any of the maximum value of the disparities, the mean value of the disparities, and the variance of the disparities. In the case where the mean value of the disparities is calculated as the representative value, the comparison value is a difference between the first representative value and the second representative value, for example, as in the case of the mean value of the disparities. In other words, the comparison value is a difference between the first editing point or the first alternative editing point and the second editing point or the second alternative editing point. In the case where the variance of the disparities is calculated as the representative value, the comparison value is a ratio between the first representative value and the second representative value, for example. In other words, the comparison value is a ratio between the first editing point or the first alternative editing point and the second editing point or the second alternative editing point. It is to be noted that, in order that the difference between the first editing point or the first alternative editing point and the second editing point or the second alternative editing point becomes a positive value, a value obtained by subtracting the smaller one of the two values from the larger one thereof may be calculated. In order that the ratio between the first editing point or the first alternative editing point and the second editing point or the second alternative editing point becomes a value greater than 1, a value obtained by dividing the larger one of the two values by the smaller one thereof may be calculated. In addition, the representative value of disparity information may be calculated not only for each pixel of a frame, but also for each block made up of a plurality of pixels.

With this, as the representative value, the maximum value, the mean value, or the variance of a plurality of disparities calculated on a pixel or block basis is adopted. Thus, a value definite as a statistical value can be used, with the result that the disparity information can be appropriately processed.

Although the disparity information before the first point in time T1 is changed so that the first depth difference ΔD1 becomes less than or equal to the predetermined value ΔDp in the above embodiments, it may be possible to, instead of changing the disparity information before the first point in time T1, change the disparity information after the second point in time T2 or change both the disparity information before the first point in time T1 and the disparity information after the second point in time T2.

Although the number of candidate editing points is three frames both before and after the first point in time in the above Embodiment 1, the number of candidate editing points is not limited to three frames both before and after the first point in time and may be two or five frames both before and after the first point in time, for example, and moreover, the candidate editing points are not limited to sequential frames and may be frames at five-frame intervals within the range of one second before and after the first point in time. Furthermore, the first predetermined range R1 is not limited to the range before and after the first point in time and may be a range before the first point in time (for example, six frames before the first point in time) or a range after the first point in time (for example, six frames after the first point in time). Furthermore, as long as the candidate editing points are within the first predetermined range R1, the number of candidate editing points is not limited to plural frames and may be one frame. This is the case for the number of first candidate editing points and the number of second candidate editing points in Embodiment 2.

In the above Embodiment 2, in the process of searching for an alternative editing point, the first minimum value $D1_{min}$, the first maximum value $D1_{MAX}$, the second minimum value $D2_{min}$, and the second maximum value $D2_{MAX}$ are extracted, then the third depth difference $\Delta D3$, the fourth depth difference $\Delta D4$, the fifth depth difference $\Delta D5$, and the sixth depth difference $\Delta D6$ are calculated, and thus it is determined whether or not these four depth differences are less than or equal to the predetermined value $\Delta Dp$. However, it may be that, instead of these four depth differences, a plurality of depth differences based on all possible pairs each made by selecting one of the six third representative values and one of the six fourth representative values is calculated and it is determined whether or not the depth differences are less than or equal to the predetermined value $\Delta Dp$. Also in this case, when more than one of the depth differences is less than or equal to the predetermined value $\Delta Dp$, the first candidate editing point and the second candidate editing point which correspond to the smallest depth difference among the depth differences are adopted as the first alternative editing point and the second alternative editing point.

With this, a user no longer needs to search for a new editing point. Furthermore, all the sets of the first candidate editing point and the second candidate editing point are searched for two alternative editing points, i.e., the first alternative editing point and the second alternative editing point, with the result that editing points with a high degree of flexibility can each be selected as the cut point. Accordingly, the load on a user in editing three-dimensional video can further be reduced.

In the process of searching for an alternative editing point, when more than one of the second depth differences is less than or equal to the predetermined value $\Delta Dp$ or when more than one depth difference among the third depth difference, the fourth depth difference, the fifth depth difference, and the sixth depth difference is less than or equal to the predetermined value $\Delta Dp$, the first candidate editing point or the first candidate editing point and the second candidate editing point which correspond to the smallest depth difference among the depth differences less than or equal to the predetermined $\Delta Dp$ are adopted as the first alternative editing point or the first alternative editing point and the second alternative editing point in the above embodiments, but the adoption of the smallest depth difference is not only option. For example, when more than one of the depth differences is less than or equal to the predetermined value $\Delta Dp$, it may be that the first candidate editing point closest to the first point in time T1 is adopted as the first alternative editing point or that a set of the first candidate editing point and the second candidate editing point which are closest to the first point in time T1 and the second point in time T2 is adopted as the first alternative editing point and the second alternative editing point.

With this, even when there is a plurality of corresponding candidate editing points, a candidate editing point closest in position to the editing point selected by a user can be automatically selected. Thus, the editing point selected by the user can be appreciated, and it is possible to automatically narrow down to one candidate editing point.

It is to be noted that in each of the above embodiments, each structural element may be configured in the form of an exclusive hardware product or may be realized by executing a software program suitable for the structural element. Each structural element may be realized by means of a program executing unit, such as a CPU or a processor, reading and executing the software program recorded on a non-transitory recording medium such as a hard disk or a semiconductor memory. Here, the software program for realizing the video editing apparatus according to each of the above embodiments is a program described below.

Specifically, this program causes a computer to execute a video editing method of cutting out, from three-dimensional video including right-eye video and left-eye video, part of the three-dimensional video between a first point in time and a second point in time when a user selects a first editing point of the three-dimensional video at the first point in time and a second editing point of the three-dimensional video at the second point in time, the video editing method comprising: receiving the first and second editing points selected by the user; obtaining a representative value of first disparity information on disparities of the first editing point and a representative value of second disparity information on disparities of the second editing point; calculating, as a first comparison value, a value which is based on a comparison between the representative value of the first disparity information and the representative value of the second disparity information; determining whether or not the first comparison value calculated in the calculating is less than or equal to a predetermined value; and presenting a message prompting a user to change at least one of the first editing point and the second editing point when it is determined in the determining that the first comparison value is greater than the predetermined value.

The video editing apparatus according to one or more implementations of the present invention has been described above based on the embodiments, the present invention is not limited to these embodiments. The scope of one or more implementations of the present invention may include, without departing from the spirit and scope of the present invention, other embodiments that are obtained by making various modifications that those skilled in the art could think of, to the present embodiments, or by combining structural elements in different embodiments.

INDUSTRIAL APPLICABILITY

The present invention is available as a terminal device or the like which incorporates a video editing apparatus capable of editing three-dimensional video in a way that the edited three-dimensional video will not give viewers a feeling of strangeness.

REFERENCE SIGNS LIST

1 Terminal device
11 Hard disk
12 ROM
13 RAM
14 Input device
15 Display
16 LAN I/F
31 Selection unit
32 Representative value generation unit
33 Comparison value calculation unit
34 Determination unit
35 Presenting unit
36 Disparity changing unit
37 Display unit
38 Input unit
100 Video editing apparatus
200 Video editing apparatus
A1 Preview screen area A2 Library selection section
A3 Operation section
A4 Editing track display section
$D1_{MAX}$ First maximum value
$D1_{min}$ First minimum value
$D2_{MAX}$ Second maximum value
$D2_{min}$ Second minimum value
ΔD1 First depth difference
ΔD2 Second depth difference
ΔD3 Third depth difference
ΔD4 Fourth depth difference
ΔD5 Fifth depth difference
ΔD6 Sixth depth difference
ΔDp Predetermined value
M1 First editing point
M2 Second editing point
M11 First alternative editing point
R1 First predetermined range, Second predetermined range
R2 Disparity change range
T1 First point in time
T2 Second point in time
d1-d6 Third representative value
t1-t6 Time

The invention claimed is:

1. A video editing apparatus which cuts out, from three-dimensional video including right-eye video and left-eye video, part of the three-dimensional video between a first point in time and a second point in time different from the first point in time when a user selects a first editing point of the three-dimensional video at the first point in time and a second editing point of the three-dimensional video at the second point in time, the video editing apparatus comprising:
a selection unit configured to receive the first and second editing points selected by the user;
a representative value generation unit configured to generate a representative value of first disparity information on disparities of the first editing point and a representative value of second disparity information on disparities of the second editing point;
a comparison value calculation unit configured to calculate, as a first comparison value, a value which is based on a comparison between the representative value of the first disparity information and the representative value of the second disparity information; and
a determination unit configured to determine whether or not the first comparison value calculated by the comparison value calculation unit is less than or equal to a predetermined value,
wherein, when the first comparison value is greater than the predetermined value, the representative value generation unit, the comparison value calculation unit, and the determination unit perform a searching process to search a first predetermined range for a first alternative editing point which has a representative value of disparity information on disparities that, when compared with the representative value of the second disparity information, leads to a second comparison value less than or equal to the predetermined value, the first predetermined range being a time range based on the first point in time, and the second comparison value being a value which is based on a comparison between the first alternative editing point and the representative value of the second disparity information, and
the video editing apparatus further comprises a presenting unit configured to present, to the user, the first alternative editing point searched for in the searching process.

2. The video editing apparatus according to claim 1,
wherein the representative value generation unit is configured to obtain, in the searching process, a representative value of third disparity information on disparities of a candidate editing point at a point in time which is within the first predetermined range and different from the first point in time,
the comparison value calculation unit is configured to calculate, as a second comparison value, a value which is based on a comparison between the representative value of the second disparity information and the representative value of the third disparity information, in the searching process,
the determination unit is configured to determine, in the searching process, whether or not the second comparison value is less than or equal to the predetermined value, and
the presenting unit is configured to present, to the user, the candidate editing point as the first alternative editing point when the determination unit determines that the second comparison value is less than or equal to the predetermined value.

3. The video editing apparatus according to claim 2,
wherein the representative value generation unit is configured to obtain, in the searching process, a plurality of representative values of the third disparity information on disparities of a plurality of the candidate editing points at points in time which are within the first predetermined range and different from the first point in time,
the comparison value calculation unit is configured to calculate, in the searching process, a plurality of the second comparison values in a one-to-one correspondence with the representative values of the third disparity information,
the determination unit is configured to determine, in the searching process, whether or not each of the second comparison values is less than or equal to the predetermined value, and
the presenting unit is configured to present, to the user, a candidate editing point that corresponds to the second comparison value determined to be less than or equal to the predetermined value, as the first alternative editing point.

4. The video editing apparatus according to claim 3, wherein, when more than one of the second comparison values is determined to be less than or equal to the predetermined value, the presenting unit is configured to present, to the user, a candidate editing point corresponding to a smallest one of the second comparison values, as the first alternative editing point.

5. The video editing apparatus according to claim 3, wherein, when more than one of the second comparison values is determined to be less than or equal to the predetermined value, the presenting unit is configured to present, to the user, a candidate editing point closest to the first point in time among candidate editing points corresponding to the second comparison values, as the first alternative editing point.

6. The video editing apparatus according to claim 1,
wherein the representative value generation unit is configured to obtain, in the searching process, a representative value of third disparity information on disparities of a first candidate editing point at a point in time which is within the first predetermined range and different from the first point in time, and a representative value of fourth disparity information on disparities of a second candidate editing point at a point in time which is within a second predetermined range and different from the second point in time, the second predetermined range being a time range based on the second point in time, the comparison value calculation unit is further configured to calculate, as a second comparison value, a value which is based on a comparison between the representative value of the third disparity information and the representative value of the fourth disparity information, in the searching process, the determination unit is configured to determine, in the searching process, whether or not the second comparison value is less than or equal to the predetermined value, and the presenting unit is configured to present, to the user, the first candidate editing point as the first alternative editing point and the second candidate editing point as a second alternative editing point when the determination unit determines that the second comparison value is less than or equal to the predetermined value.

7. The video editing apparatus according to claim 6, wherein the representative value generation unit is configured to obtain, in the searching process, a plurality of representative values of the third disparity information on disparities of a plurality of the first candidate editing points at points in time which are within the first predetermined range and different from the first point in time, and a plurality of representative values of the fourth disparity information on disparities of a plurality of the second candidate editing points in time which are within the second predetermined range and different from the second point in time, the comparison value calculation unit is configured to, in the searching process, (i) extract a first minimum value that is a minimum value among the representative values of the third disparity information, a first maximum value that is a maximum value among the representative values of the third disparity information, a second minimum value that is a minimum value among the representative values of the fourth disparity information, and a second maximum value that is a maximum value among the representative values of the fourth disparity information, and (ii) calculate a third comparison value that is a value based on a comparison between the first minimum value and the second minimum value, a fourth comparison value that is a value based on a comparison between the first minimum value and the second maximum value, a fifth comparison value that is a value based on a comparison between the first maximum value and the second minimum value, and a sixth comparison value that is a value based on a comparison between the first maximum value and the second maximum value, the determination unit is configured to determine, in the searching process, whether or not each of the third comparison value, the fourth comparison value, the fifth comparison value, and the sixth comparison value is less than or equal to the predetermined value, and when one of the third comparison value, the fourth comparison value, the fifth comparison value, and the sixth comparison value is less than or equal to the predetermined value, the presenting unit is further configured to (i) refer to the first candidate editing point and the second candidate editing point which correspond to the one of the third comparison value, the fourth comparison value, the fifth comparison value, and the sixth comparison value, which is less than or equal to the predetermined value, and (ii) present, to the user, the first candidate editing point as the first alternative editing point and the second candidate editing point as the second alternative editing point.

8. The video editing apparatus according to claim 7, wherein, when more than one of the third comparison value, the fourth comparison value, the fifth comparison value, and the sixth comparison value is less than or equal to the predetermined value, the presenting unit is further configured to (i) refer to the first candidate editing point and the second candidate editing point which correspond to a smallest comparison value among the comparison values less than or equal to the predetermined value, and (ii) present, to the user, the first candidate editing point as the first alternative editing point and the second candidate editing point as the second alternative editing point.

9. The video editing apparatus according to claim 7, wherein, when more than one of the third comparison value, the fourth comparison value, the fifth comparison value, and the sixth comparison value is less than or equal to the predetermined value, the presenting unit is further configured to (i) refer to a combination of the first candidate editing point and the second candidate editing point which are closest to the first point in time and the second point in time among combinations of a plurality of the first candidate editing points and a plurality of the second candidate editing points which correspond to the comparison values less than or equal to the predetermined value, and (ii) present, to the user, the first candidate editing point as the first alternative editing point and the second candidate editing point as the second alternative editing point.

10. The video editing apparatus according to claim 6, wherein the representative value generation unit is configured to obtain, in the searching process, a plurality of representative values of the third disparity information on disparities of a plurality of the first candidate editing points at points in time which are within the first predetermined range and different from the first point in time, and a plurality of representative values of the fourth disparity information on disparities of a plurality of the second candidate editing points at points in time which are within the second predetermined range and different from the second point in time, the comparison value calculation unit is configured, in the searching process, to calculate a plurality of values as a plurality of the second comparison values in a one-to-one correspondence with pairs each made by selecting one of the representative values of the third disparity information and one of the representative values of the fourth disparity information, the plurality of values being based on comparisons between all possible pairs, the determination unit is further configured to determine, in the searching process, whether or not each of the second comparison values is less than or equal to the predetermined value, and the presenting unit is configured to (i) refer to the combination of the first candidate editing point and the second candidate editing point which correspond to the second comparison value determined to be less than or equal to the predetermined value, and (ii) present, to the user, the first candidate editing point as the first alternative editing point and the second candidate editing point as the second alternative editing point.

11. The video editing apparatus according to claim 3, further comprising a disparity changing unit configured to change at least one of the first disparity information and the second disparity information to make the first comparison value less than or equal to the predetermined value when the determination unit determines that all the second comparison values are greater than the predetermined value.

12. The video editing apparatus according to claim 1, wherein the representative value is a maximum value, a mean value, or a variance of a plurality of disparities calculated for respective pixels or blocks included in a corresponding frame.

13. The video editing apparatus according to claim 1, wherein the predetermined value is associated in an expression or a table with a size of a display unit displaying the three-dimensional video and changes based on the size of the display unit which is designated in advance by the user.

14. A video editing method of cutting out, from three-dimensional video including right-eye video and left-eye video, part of the three-dimensional video between a first point in time and a second point in time when a user selects a first editing point of the three-dimensional video at the first point in time and a second editing point of the three-dimensional video at the second point in time, the video editing method comprising:
receiving the first and second editing points selected by the user;
obtaining a representative value of first disparity information on disparities of the first editing point and a representative value of second disparity information on disparities of the second editing point;
calculating, as a first comparison value, a value which is based on a comparison between the representative value of the first disparity information and the representative value of the second disparity information;
determining whether or not the first comparison value calculated in the calculating is less than or equal to a predetermined value;
searching a first predetermined range for an alternative editing point which has a representative value of disparity information on disparities that, when compared with the representative value of the second disparity information, leads to a second comparison value less than or equal to the predetermined value, when the first comparison value is greater than the predetermined value, the first predetermined range being a time range based on the first point in time, and the second comparison value being a value which is based on a comparison between the first alternative editing point and the representative value of the second disparity information; and
presenting, to the user, the alternative editing point searched for in the searching.

15. A computer-readable non-transitory recording medium having a program recorded thereon, the program for causing a computer to execute the video editing method according to claim 14.

16. An integrated circuit which cuts out, from three-dimensional video including right-eye video and left-eye video, part of the three-dimensional video between a first point in time and a second point in time when a user selects a first editing point of the three-dimensional video at the first point in time and a second editing point of the three-dimensional video at the second point in time, the integrated circuit comprising:
a selection unit configured to receive the first and second editing points selected by the user;
a representative value generation unit configured to obtain a representative value of first disparity information on disparities of the first editing point and a representative value of second disparity information on disparities of the second editing point;
a comparison value calculation unit configured to calculate, as a first comparison value, a value which is based on a comparison between the representative value of the first disparity information and the representative value of the second disparity information; and
a determination unit configured to determine whether or not the first comparison value calculated by the comparison value calculation unit is less than or equal to a predetermined value,
wherein, when the first comparison value is greater than the predetermined value, the representative value generation unit, the comparison value calculation unit, and the determination unit perform a searching process to search a first predetermined range for a first alternative editing point which has a representative value of disparity information on disparities that, when compared with the representative value of the second disparity information, leads to a second comparison value less than or equal to the predetermined value, the first predetermined range being a time range based on the first point in time, and the second comparison value being a value which is based on a comparison between the first alternative editing point and the representative value of the second disparity information, and
the integrated circuit further comprises a presenting unit configured to present, to the user, the first alternative editing point searched for in the searching process.

* * * * *